(12) United States Patent
Way

(10) Patent No.: US 7,577,367 B2
(45) Date of Patent: Aug. 18, 2009

(54) OPTICAL COMMUNICATION USING DUOBINARY MODULATION

(75) Inventor: Winston I. Way, Irvine, CA (US)

(73) Assignee: Op Vista Incorporated, Milpitas, CA (US)

( * ) Notice: Subject to any disclaimer, the term of this patent is extended or adjusted under 35 U.S.C. 154(b) by 407 days.

(21) Appl. No.: 11/154,930

(22) Filed: Jun. 15, 2005

(65) Prior Publication Data
US 2005/0286908 A1   Dec. 29, 2005

Related U.S. Application Data

(60) Provisional application No. 60/579,903, filed on Jun. 15, 2004.

(51) Int. Cl.
*H04B 10/04* (2006.01)
(52) U.S. Cl. .................. 398/183; 398/182; 398/185; 398/188; 398/189; 359/245; 359/248; 359/237; 359/238; 385/1; 385/14; 385/2; 385/3
(58) Field of Classification Search ............... 398/182, 398/183, 188, 186, 196, 202, 79, 82, 76, 398/91, 192, 193, 194, 163, 198, 141, 147, 398/158, 159, 184, 185, 187, 189, 195, 197, 398/200, 201; 385/1, 2, 3, 4, 24, 11, 40, 385/14; 359/245, 248, 237, 238
See application file for complete search history.

(56) References Cited

U.S. PATENT DOCUMENTS 5,062,684 A   11/1991   Clyton et al.
5,101,450 A   3/1992    Olshansky
5,239,401 A   8/1993    Olshansky
5,301,058 A   4/1994    Olshansky
5,333,000 A   7/1994    Hietala et al.
5,390,188 A   2/1995    Dawson et al.
5,442,623 A   8/1995    Wu
5,479,082 A   12/1995   Calvani et al.
5,509,093 A   4/1996    Miller et al.
5,539,559 A   7/1996    Cisneros et al.

(Continued)

FOREIGN PATENT DOCUMENTS

| DE | 19828614 | 12/1999 |
| WO | WO96/32787 | 10/1996 |
| WO | WO01/67647 | 9/2001 |
| WO | WO01/67648 | 9/2001 |
| WO | WO02/23772 | 3/2002 |

(Continued)

OTHER PUBLICATIONS

Adamczyk, et al. "All-Optical Output-Port Contention Resolution Using Subcarrier-Multiplexing", Optical Fiber Communications Conference 2000, Mar. 7-10, 2000, pp. 332-334.

(Continued)

*Primary Examiner*—Hanh Phan
(74) *Attorney, Agent, or Firm*—Fish & Richardson P.C.

(57) ABSTRACT

Optical techniques, devices and systems for combining duobinary modulation and optical subcarrier multiplexing in optical communication applications. An analog mixer is used to mix a duobinary signal for a data channel and a local oscillator signal to produce a modulation control signal for controlling the subsequent optical subcarrier multiplexing modulation. Various optical subcarrier multiplexing modulation techniques may be used including optical single sideband modulators and optical double sideband modulators.

13 Claims, 16 Drawing Sheets

U.S. PATENT DOCUMENTS

| | | | |
|---|---|---|---|
| 5,546,210 A | 8/1996 | Chraplyvy et al. | |
| 5,596,436 A | 1/1997 | Sargis et al. | |
| 5,600,466 A | 2/1997 | Tsushima et al. | |
| 5,608,825 A | 3/1997 | Ip | |
| 5,617,233 A | 4/1997 | Boncek | |
| 5,625,478 A | 4/1997 | Doerr et al. | |
| 5,663,820 A | 9/1997 | Shiragaki | |
| 5,680,235 A | 10/1997 | Johansson | |
| 5,696,614 A | 12/1997 | Ishikawa et al. | |
| 5,710,650 A | 1/1998 | Dugan | |
| 5,712,716 A | 1/1998 | Vanoli et al. | |
| 5,717,795 A | 2/1998 | Sharma et al. | |
| 5,734,493 A | 3/1998 | Jopson | |
| 5,742,416 A | 4/1998 | Mizrahi | |
| 5,745,273 A | 4/1998 | Jopson | |
| 5,764,821 A | 6/1998 | Glance | |
| 5,778,118 A | 7/1998 | Sridhar | |
| 5,781,327 A | 7/1998 | Brock et al. | |
| 5,784,184 A | 7/1998 | Alexander et al. | |
| 5,786,913 A | 7/1998 | Pfeiffer | |
| 5,796,501 A | 8/1998 | Sotom et al. | |
| 5,822,095 A | 10/1998 | Taga et al. | |
| 5,838,475 A | 11/1998 | Takeyari et al. | |
| 5,870,212 A | 2/1999 | Nathan et al. | |
| 5,880,870 A | 3/1999 | Sieben et al. | |
| 5,896,212 A | 4/1999 | Sotom et al. | |
| 5,917,638 A | 6/1999 | Franck et al. | |
| 5,923,449 A | 7/1999 | Doerr et al. | |
| 5,938,309 A | 8/1999 | Taylor | |
| 5,940,197 A | 8/1999 | Ryu | |
| 5,949,273 A | 9/1999 | Mourick et al. | |
| 5,949,560 A | 9/1999 | Roberts et al. | |
| 5,953,141 A | 9/1999 | Liu et al. | |
| 5,982,518 A | 11/1999 | Mizarahi | |
| 5,982,963 A | 11/1999 | Feng et al. | |
| 6,008,931 A | 12/1999 | Von Helmolt et al. | |
| 6,023,359 A | 2/2000 | Asahi | |
| 6,035,080 A | 3/2000 | Henry et al. | |
| 6,069,732 A | 5/2000 | Koch et al. | |
| 6,084,694 A | 7/2000 | Milton et al. | |
| 6,088,141 A | 7/2000 | Merli et al. | |
| 6,118,566 A | 9/2000 | Price et al. | |
| 6,130,766 A | 10/2000 | Cao | |
| 6,163,553 A | 12/2000 | Pfeiffer | |
| 6,191,854 B1 | 2/2001 | Grasso et al. | |
| 6,192,173 B1 | 2/2001 | Solheim et al. | |
| 6,195,186 B1 | 2/2001 | Asahi | |
| 6,195,351 B1 | 2/2001 | Hiscock et al. | |
| 6,201,909 B1 | 3/2001 | Kewitsch et al. | |
| 6,208,441 B1 | 3/2001 | Jones et al. | |
| 6,211,980 B1 | 4/2001 | Terahara | |
| 6,222,654 B1 | 4/2001 | Frigo | |
| 6,259,836 B1 | 7/2001 | Dodds | |
| 6,271,946 B1 | 8/2001 | Chang et al. | |
| 6,285,479 B1 | 9/2001 | Okazaki et al. | |
| 6,339,663 B1 | 1/2002 | Leng et al. | |
| 6,351,323 B1 | 2/2002 | Onaka et al. | |
| 6,369,923 B1 | 4/2002 | Kuo et al. | |
| 6,385,204 B1 | 5/2002 | Hoefelmeyer et al. | |
| 6,404,535 B1 | 6/2002 | Leight | |
| 6,414,765 B1 | 7/2002 | Li et al. | |
| 6,433,904 B1 | 8/2002 | Swanson et al. | |
| 6,466,342 B1 | 10/2002 | Frigo et al. | |
| 6,525,852 B1 | 2/2003 | Egnell | |
| 6,525,857 B1 | 2/2003 | Way et al. | |
| 6,556,744 B1 | 4/2003 | Brimacombe et al. | |
| 6,560,252 B1 | 5/2003 | Colbourne et al. | |
| 6,580,537 B1 | 6/2003 | Chang et al. | |
| 6,590,681 B1 | 7/2003 | Egnell et al. | |
| 6,657,952 B1 | 12/2003 | Shiragaki et al. | |
| 6,661,976 B1 | 12/2003 | Gnauck et al. | |
| 6,701,085 B1 | 3/2004 | Muller | |
| 6,788,899 B2 | 9/2004 | Way | |
| 6,891,981 B2 * | 5/2005 | Price et al. | 385/2 |
| 6,895,184 B2 | 5/2005 | Way | |
| 6,970,655 B2 * | 11/2005 | Ono et al. | 398/186 |
| 7,003,231 B2 | 2/2006 | Way et al. | |
| 7,024,112 B2 | 4/2006 | Way | |
| 7,068,949 B2 | 6/2006 | Jung et al. | |
| 7,120,359 B2 | 10/2006 | Way | |
| 7,206,520 B2 | 4/2007 | Way et al. | |
| 2002/0012148 A1 | 1/2002 | Oksanen | |
| 2002/0015553 A1 | 2/2002 | Claringburn et al. | |
| 2002/0023170 A1 | 2/2002 | Seaman et al. | |
| 2002/0030877 A1 | 3/2002 | Way et al. | |
| 2002/0063928 A1 * | 5/2002 | Hansen et al. | 359/130 |
| 2002/0067523 A1 | 6/2002 | Way | |
| 2002/0080440 A1 | 6/2002 | Li et al. | |
| 2002/0114034 A1 | 8/2002 | Way | |
| 2002/0126350 A1 | 9/2002 | Sato et al. | |
| 2002/0135838 A1 | 9/2002 | Way | |
| 2003/0025961 A1 | 2/2003 | Way | |
| 2003/0169470 A1 | 9/2003 | Alagar et al. | |
| 2003/0180047 A1 | 9/2003 | Way et al. | |
| 2004/0208561 A1 | 10/2004 | Kinoshita et al. | |
| 2005/0018600 A1 | 1/2005 | Tornar | |
| 2005/0025490 A1 | 2/2005 | Aoki et al. | |
| 2005/0078965 A1 | 4/2005 | Kim et al. | |
| 2005/0158047 A1 | 7/2005 | Way et al. | |
| 2005/0185969 A1 * | 8/2005 | Moeller et al. | 398/202 |
| 2005/0201762 A1 * | 9/2005 | Moeller et al. | 398/202 |
| 2006/0051092 A1 | 3/2006 | Way | |
| 2006/0140643 A1 | 6/2006 | Way et al. | |
| 2006/0269295 A1 | 11/2006 | Way | |
| 2006/0275035 A1 | 12/2006 | Way | |
| 2007/0086332 A1 | 4/2007 | Way et al. | |

FOREIGN PATENT DOCUMENTS

| | | |
|---|---|---|
| WO | WO02/058301 | 7/2002 |
| WO | WO2004/002024 | 12/2003 |
| WO | WO2004/064259 | 7/2004 |
| WO | WO2006/002080 | 1/2006 |
| WO | WO2006/119375 | 11/2006 |
| WO | WO2007/044939 | 4/2007 |

OTHER PUBLICATIONS

Bannister, et al. "How Many Wavelengths Do We Really Need?, A Study of the Performance Limits of Packet Over Wavelengths", SPIE Optical Network Magazine, Apr. 2000, pp. 1-12.

Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

Bosco, G. et al., "Modulation formats suitable for ultrahigh spectral efficient WDM systems," IEEE J. Selected Topics in Quantum Electron. 10(22): 321-328 (Mar./Apr. 2004).

Bosco, G. et al., "On the use of NRZ, RZ, and CSRZ modulation at 40 Gb/s with narrow DWDM channel spacing," Journal of Lightwave Technology, p. 1694-1704, Sep. 2002.

Ramamurthy, Byrav, et al. "Wavelength Conversion in WDM Networking", IEEE Journal on Selected Areas in Communication, vol. 16, Sep. 1998, pp. 1061-1073.

Chao, et al. "A Photonic Front-End Processor in a WDM ATM Multicast Switch", Journal of Lightwave Technology, vol. 18, No. 3, Mar. 2000, pp. 273-285.

Daikoku, M. et al., "Performance comparison of modulation formats for 40Gb/s DWDM transmission systems, " paper OFN2, Optical Fiber Communications (OFC) Conference, 2005, 3 pages.

Derr, et al. "An Optical Infrastructure for Future Telecommunications Networks", IEEE Communications Magazine, vol. 33, No. 11, Nov. 1995 pp. 84-88.

English language Translation of DE 19828614, published Dec. 30, 1999, entitled "Method and device for optical transmission via light waveguides", 10 pages.

Frankel, et al. "Optical Single-Sideband Suppressed-Carrier Modulator for Wide-Band Signal Processing", Journal of Lightwave Technology, vol. 16, No. 5, May 1998, pp. 859-863.
Gerstel, O. and R. Ramaswami, "Optical layer survivability: a service perspective," IEEE Communications Magazine, pp. 104-113, Mar. 2000.
Ghani, "Lambda-Labeling: A Framework for IP-Over-WDM Using MPLS", Optical Networks Magazine, vol. 1, No. 2, Apr. 2000, pp. 45-58.
Gnauck, A.H. and P.J. Winzer, "Optical phase shifted keyed transmission," Journal of Lightwave Technology 23(1): 115-130 (Jan. 2005).
Goldstein et al., "Performance implications of component crosstalk in transparent lightwave netowrks," IEEE Photonics Technolog Letters 6(5): 657-660, (May 1994).
Heismann, "Polarization Mode Dispersion: Fundamentals and Impact on Optical Communication System", European Conference of Optical Communications (ECOC '98), Sep. 20-24, 1998, Madrid, Spain, vol. 2, pp. 51-79 (1998).
Hill, et al. "Multigigabit Subcarrier Multiplexed Coherent Lightwave System", Journal of Lightwave Technology, vol. 10, No. 11, Nov. 1992, pp. 1656-1664.
Hui, R., "Multitributary OFDM optical transmitter using carrier-suppressed optical single-sideband modulation," Optical Fiber Communications Conference, 2003. OFC 2003, Mar. 23-28, 2003 pp. 92-93.
Hui et al., "10 Gb/s SCM system using optical single side-band modulation," Optical Fiber Communication Conference and Exhibit, 2001. OFC 2001, vol. 1, Issue , 2001 pp. MM4-1-MM4-4.
ITU-T Recommendation G.692, "Optical Interfaces for Multichannel Systems with Optical Amplifiers", Oct. 1998, pp. 14-23.
Izutsu, et al., "Integrated Optical SSB Modulation/Frequency Shifter", IEEE Journal of Quantum Electronics, vol. QE-17, No. 11, Nov. 1981, pp. 2225-2227.
Jiang et al., "Multi-Lane PMD Reliability and Partial Fault Protection (PFP)," IEEE 802.3ba, Jan. 2008, 25 pages, http://www.ieee802.org/3/ba/public/jan08/jiang_01_0108.pdf [accessed on Apr. 8, 2008].
Johansson, B.S. et al., "Flexible bus: a self-restoring optical ADM ring architecture," Electronic Letters, vol. 32, No. 25, pp. 2338-2339, Dec. 1996.
Joo, Y. et al., "1-fiber WDM self-healing ring with bidirectional optical add/drop multiplexers," IEEE Photon. Technol. Lett. 16(2):: 683-685 (Feb. 2004).
Kaminow, I. and T. Li, (Eds.), *Optical Fiber Telecommunications IVB: Systems and Impairments*, San Diego: Academic Press, Chapter 16, pp. 868-876 (2002).
Khrais, et al. "Effects of Cascaded Misaligned Optical (de)Multiplexers on Multiwavelength Optical Network Performance", OFC, Paper ThD-4, Feb. 1996.
Kinoshita et al., "Metro WDM network with photonic domains," Optical Fiber Communication Conference OFC 2004, vol. 1, Feb. 23-27, 2004, 3 pages.
Kitayama, "Highly Spetrum Efficient OFDM/PDM Wireless Networks by Using Optical SSB Modulation", Journal of Lightwave Technology, vol. 16, No. 6, Jun. 1998, pp. 969-976.
Lee, et al. "A Wavelength-Convertible Optical Network", Journal of Lightwave Technology, vol. 11, May/Jun. 1993, p. 962.
Lyubomirsky, I. and C. Chien, "Tailoring the duobinary pulse shape for optimum performance," J. Lightwve Technology 23(11): 3732-3736 (Nov. 2005).
Masetti, et al. "High Speed, High Capacity ATM Optical Switches for Future Telecommunication Transport Networks", IEEE Journal on Selected Areas in Communications, vol. 14, No. 5, Jun. 1996, pp. 979-998.
Ohn, et al. "Dispersion Variable Fibre Bragg Grating Using a Piezoelectric Stack", Electronic Letters, vol. 32, No. 21, Oct. 10, 1996, pp. 2000-2001.
Okamoto, et al. "Optical Path Cross-Connect Systems for Photonic Networks", Global Telecommunications Conference, Nov. 1993, vol. 1, pp. 474-480.
Ono, T. et al., "Characteristics of optical duobinary signals in terabit/s capacity, high spectral efficiency WDM systems, " J. Lightwave Technology 16(5): 788-797, May 1998.
Ramos, et al. "Comparison of Optical Single-Sideband Modulation and Chirped Fiber Gratings as Dispersion Mitigating Techniques in Optical Millimeter-Wave Multichannel Systems", IEEE Photonics Technology Letters, vol. 11, No. 11, Nov. 1999, pp. 1479-1481.
Sano et al., "30×100 gb/s all-optical OFDM transmission over 1300 km SMF with 10 ROADM nodes", Technical Digest of ECOC 2007, Paper PDS1.7 (2007), 2 pages.
Sargis, P.D. et al., "10-G-b/s subcarrier muliplexed transmission over 490 km of ordinary single-mode fiber without dispersion compensation," IEEE Photon. Technol. Lett. 9(12):: 1658-1660, (Dec. 1997).
Shankar, "Duobinary Modulation for Optical Systems," Dec. 5, 2002 http://www.inphi-corp.com/products/whitepapers/DuobinaryModulationForOpticalSystems.pdf [accessed on Oct. 14, 2005], 10 pages.
Shi et al., "High-speed electrooptic modulator characterization using optical spectrum analysis," J. Lightwave Technol. 21(10): 2358-2367, (Oct. 2003).
Shtaif, M. and A.H. Gnauck, "The relation between optical duobinary modulation and spectral efficiency in WDM systems," IEEE Photon. Technol. Lett. 11(6): 712-714 (Jun. 1999.
Sieben, et al. "Optical Single Sideband Transmission at 10 Gb/s Using Only Electrical Dispersion Compensation", Journal of Lightwave Technology, vol. 17, No. 10, Oct. 1999, pp. 1742-1748.
Smith, et al. "Broad-Band Millimeter-Wave (38 GHz) Fiber-Wireless Transmission System Using Electrical and Optical SSB Modulation to Overcome Dispersion Effects", IEEE Photonics Technology Letters, vol. 10, No. 1, Jan. 1998, pp. 141-144.
Smith et al., "Overcoming Chromatic-Dispersion Effects in Fiber-Wireless Systems Incorporating External Modulators," IEEE Transactions on Microwave Theory and Techniques 45(8): 1410-1415 (Aug. 1997).
Spring, et al. "Photonic Header Replacement for Packet Switching", Electronic Letters, vol. 29, No. 17, Aug. 19, 1993, pp. 1523-1525.
Sun, et al. "Tunable Compensation of Dispersion-Induced RF Power Degradation in Multiple-Channel SCM Transmission by Nonlinearly-Chirped FBG's", CLEO '99, 1999, pp. 316-317.
van den Borne, D. et al., "Coherent equalization versus direct detection for 111-Gb/s Ethernet transport," IEEE LEOS Summer Tropical Meetings, pp. 11-12, Jul. 23-25, 2007.
van Deventer et al., "Power penalties due to Brillouin and Rayleigh scattering in a bi-directional coherent transmission system," IEEE Photon. Lett. 6(2): 291-294 (Feb. 1994).
Walkin, "Multilevel Signaling for Increasing the Reach of 10 Gb/s Lightwave Systems", Journal of Lightwave Technology, vol. 17, No. 11, Nov. 1999 pp. 2235-2248.
Way, "Broadband Hybrid Fiber Coax Access System Technologies", New York Acacemic Press, 1998, pp. 253-300.
Way, "Subcarrier Multiplexed Lightwave System Design Considerations for Subscriber Loop Applications", Journal of Lightwave Technology, vol. 7, No. 11, Nov. 1989, pp. 1806-1818.
Way, W.I.., "Spectrally efficient parallel PHY for 100 GbE MAN and WAN," IEEE Applications and Practice (distributed with IEEE Communications Magazine). pp. 20-23, (Dec. 2007).
Weng, C. and W.I. Way, "A Single-Fiber Optical Unidirectional Path-Switched-Ring Network Using Double-Sideband-Suppressed Carrier Modulation Technique," Photonics Technology Letters, IEEE 18(21): 2236-2238 (Nov. 1, 2006).
Winzer, P. and G. Raybon, "100G Ethernet- a review of serial transport options," IEEE LEOS Summer Tropical Meetings, Jul. 23-25, 2007, pp. 7-8.
Wree, C. et al., "Coherent receivers for phase-shift keyed transmission," OFC/NFOEC, paper OMP6, 2007, 3 pages.
Wu, et al. "CSO Distortions Due to the Combined Effects of Self- and External-Phase Modulations in Long-Distance 1550-nm AM-CATV Systems", IEEE Photonics Technology Letters, vol. 11, No. 6, Jun. 1999, pp. 718-720.
Xie, C. et al., "Improvement of optical NRZ- and RZ-duobinary transmission systems with narrow bandwidth optial filters," IEEE Photon. Tech. Lett. 16(9): 2162-2164 (Sep. 2004).
Yonenaga, et al. "Dispersion-Tolerant Optical Transmission System Using Duobinary Transmitter and Binary Receiver", Journal of Lightwave Technology, vol. No. 8, Aug. 1997, pp. 1530-1537.
Yonenaga et al., "Optical duobinary transmission system with no receiver sensitivity degradation," Electron Lett. vol. 31, No. 4., pp. 302-304 (Feb. 16, 1995).

* cited by examiner

FIG. 2
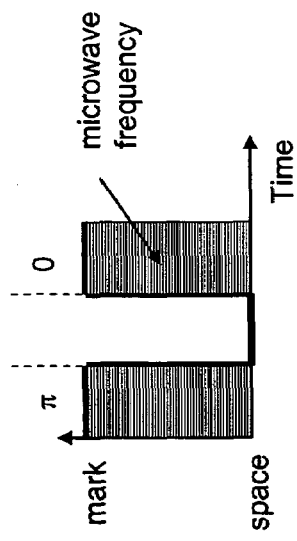
FIG. 2A
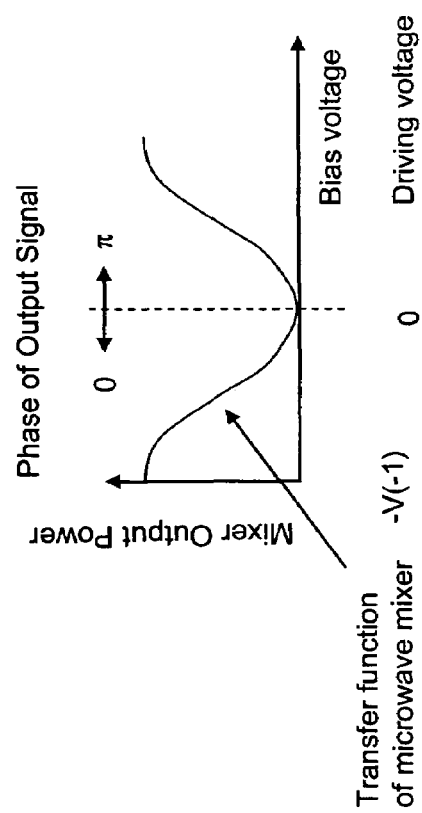
FIG. 2B
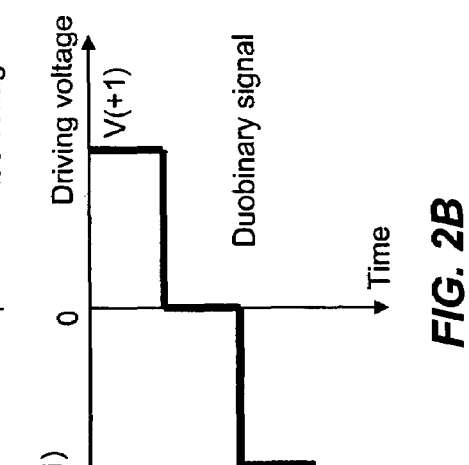
FIG. 2C

Microwave Bandwidth Compression Using Duo-binary Technique

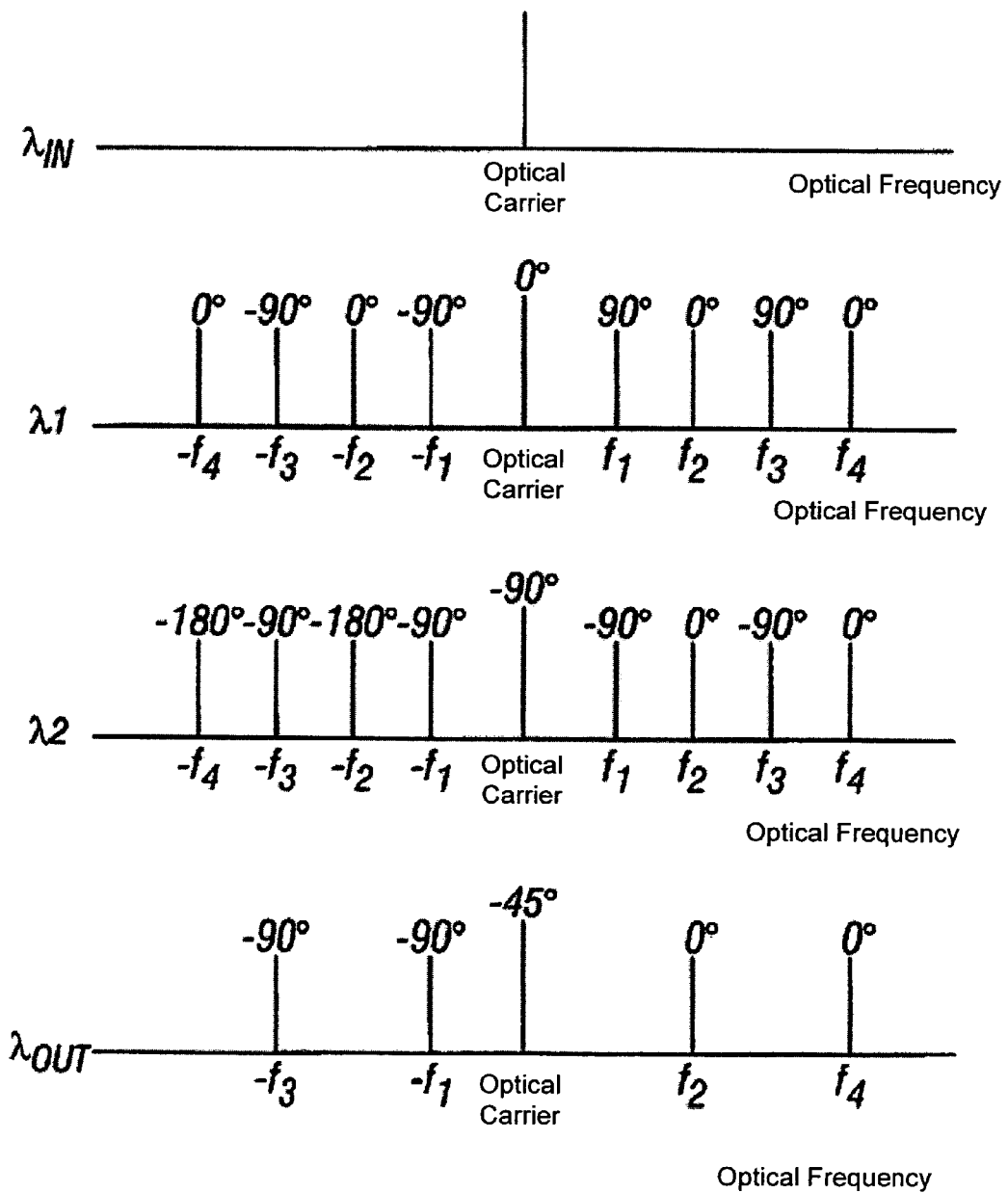

25G spacing-10 Gbps Experimental Results

OPTICAL COMMUNICATION USING DUOBINARY MODULATION

This application claims the benefit of U.S. Provisional Patent Application No. 60/579,903 entitled "MICROWAVE BANDWIDTH COMPRESSION BASED ON DUO-BINARY MODULATION AND INTERLEAVED OPTICAL SINGLE SIDEBAND MODULATION" and filed on Jun. 15, 2004, the entire disclose of which is incorporated by reference as part of the specification of this application.

This application relates to optical communications based on optical wavelength division multiplexing (WDM) and sub-carrier multiplexed (SCM) optical communication.

Optical communications use broad bandwidths in optical carriers to carry large amounts of data or information that are difficult to achieve by using microwave or RF carriers. Optical wavelength division multiplexing (WDM) further and optical sub-carrier multiplexing may be used to enhance the capacity of optical communication links and systems. The bandwidth occupied by a data channel is as a valuable asset in optical communications. Ideally, the signal bandwidth for a given data channel should be as narrow or small as possible so that more data channels may be transmitted within a given spectral bandwidth, especially in dense and ultra dense WDM optical links and networks. Notably, optical sub-carrier multiplexing may place two or more optical sub carriers at different optical wavelengths within one ITU window to achieve high density WDM.

In various optical communication applications, the bandwidth occupied by a data channel in optical communications should be as small as possible also because different spectral components within the bandwidth of the data channel may experience different dispersion effects during transmission, e.g., dispersion effects in different optical components when transmitting through transmission media such as fiber. Due to dispersion, the data in the channel may degrade to cause an increase in the bit error rate and even loss of the data in some circumstances.

Many deployed optical communication systems use non-return-to-zero (NRZ) binary modulation. As an alternative modulation approach, baseband optical duobinary modulation, has some advantages over the NRZ modulation, including increased chromatic dispersion tolerance and improved spectral efficiency with a pre-filtered pulse shape. The increased chromatic dispersion tolerance allows for data transmission over a longer distance without the need for dispersion compensation. The improved spectral efficiency can be used to implement a denser wavelength spacing in a dense WDM (DWDM) system to increase the capacity of the system.

SUMMARY

This application describes techniques, devices and systems for combining duobinary modulation and optical subcarrier multiplexing in optical communication applications. In some implementations, a single optical carrier beam from a single laser may be used to generate multiple optical subcarriers to respectively carry different data channels. Different optical subcarriers can remain stabilized relative to one another in frequency even if the optical carrier frequency of the laser fluctuates or drifts since all such optical subcarriers experience the same change in frequency. This implementation avoids the need for locking different lasers in frequency relative to one another when the lasers are used to produce different optical carrier signals for carrying different data channels. In addition, such subcarrier multiplexing allows for dense channel spacing.

Various examples are described. In one example, a first analog signal mixer is used to mix a first duobinary signal which represents a first data channel signal and a first local oscillator signal at a first local oscillator frequency to produce a first modulation control signal. A second analog signal mixer is used to mix a second duobinary signal which represents a second data channel signal and a second local oscillator signal at a second local oscillator frequency different from the first local oscillator frequency to produce a second modulation control signal. The first and second modulation control signals are then applied to modulate a CW laser beam at an optical carrier frequency to produce an optical output beam which comprises optical subcarriers at optical subcarrier frequencies different from the optical carrier frequency to carry to carry the first and the second data channels.

In another example, a device is described to include analog signal mixers to respectively produce a plurality of analog modulation control signals that respectively carry a plurality of data channels. Each analog signal mixer is configured to receive and mix a data channel encoded as a duobinary encoded signal and a local oscillator signal at a local oscillator frequency different from local oscillator frequencies received by other analog signal mixers to produce a corresponding analog modulation control signal. This device also includes an optical modulator to receive an input CW laser beam at an optical carrier frequency and to modulate the input CW laser beam in response to the analog modulation control signals to produce an optical output beam which comprises a plurality of different optical subcarriers at optical subcarrier frequencies different from the optical carrier frequency and respectively related to the local oscillator frequencies of the local oscillator signals. Each optical subcarrier carries a baseband signal comprising information of a corresponding data channel of the data channels so that the different optical subcarriers carry baseband signals corresponding to the plurality of data channels, respectively. The optical modulator may be implemented in various configurations, including optical double sideband modulators and optical single side band modulators.

In another example, at least two binary electronic signals are modulated to produce duobinary encoded signals. A CW laser beam at an optical carrier frequency are also modulated in response to the duobinary encoded signals to produce two optical single sideband subcarriers at optical frequencies different from the optical carrier frequency as an optical output. The optical output is then transmitted through an optical transmission link or network.

In yet another example, a device is described to include a plurality of electronic duobinary signal modulators to respectively receive and modulate input binary signals and to output duobinary encoded signals, and a plurality of local oscillators to produce a plurality of local oscillator signals corresponding to the electronic duobinary signal modulators, respectively. This device also includes a plurality of electronic signal mixers each of which is coupled to mix a duobinary encoded signal with a local oscillator signal from a corresponding local oscillator to produce a modulation control signal. An optical single sideband modulator is further included to receive an input CW beam at an optical carrier frequency and to modulate the beam in response to the modulation control signals from the electronic signal mixers to produce an optical output comprising the optical carrier, optical single sideband subcarriers at frequencies different from the optical carrier.

BRIEF DESCRIPTION OF DRAWINGS

FIG. 4B shows signal spectra of the signals in FIG. 4A.

DETAILED DESCRIPTION

The techniques, devices and systems described in this application use duobinary modulation to compress the bandwidth of each data channel and use optical modulation to multiplex optical sub carriers modulated with such compressed data channels onto an optical carrier. One exemplary of the optical modulation is the interleaved optical single side band sub-carrier modulation (I-OSSB-SC Modulation) as described in U.S. Pat. No. 6,525,857 which is incorporated by reference in its entirety as part of the specification of this application. Other optical modulation techniques for optical SCM modulations may also be used such as the optical double side band modulation and various optical amplitude modulation techniques. These and other SCM modulators allow for SCM demodulation using optical filters, traditional heterodyne technique such as the technique described by W. I. Way in "Subcarrier multiplexed lightwave system design considerations for subscriber loop applications," IEEE J. Lightwave Technology (pp. 1806-1818, November 1989), or coherent detection such as examples described by P. M. Hill and R. Olshansky in "Multigigabit subcarrier multiplexed coherent lightwave system," J. Lightwave Technology, vol. 10, no. 11, pp. 1656-1664, November 1992.

Figure 1:
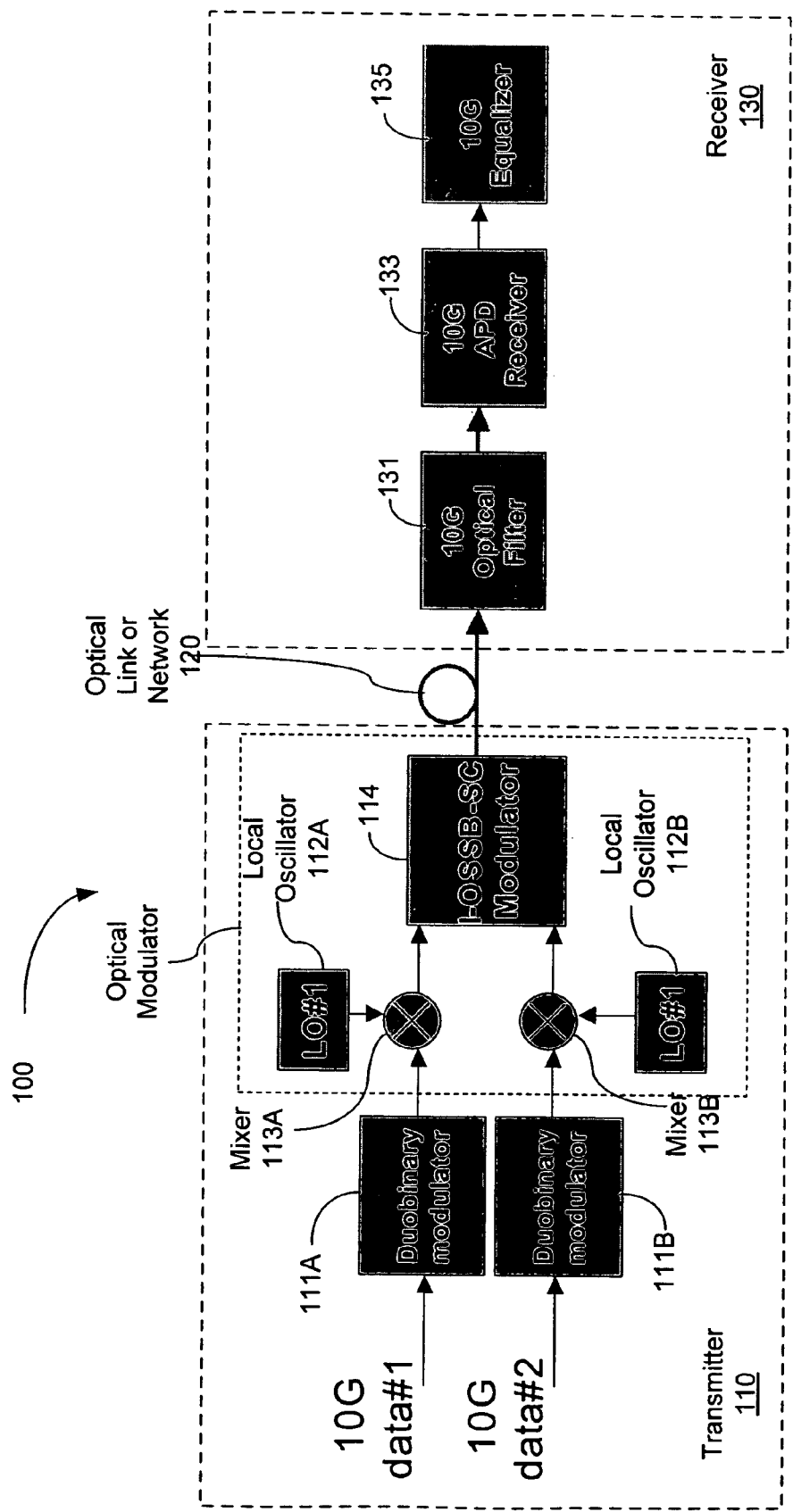
FIG. 1 shows an example of an optical communication system that combines duobinary modulation and optical subcarrier multiplexing using an optical single sideband (OSSB) modulator.

FIG. 1 illustrates one example of an optical system 100 that implements the duobinary modulation and optical subcarrier multiplexing based on the I-OSSB-SC modulation. The system 100 includes a transmitter 110, an optical link or network 120, and a receiver 130. The transmitter 110 produces an optical output that includes an optical carrier and data-carrying optical subcarriers at different optical subcarrier wavelengths modulated onto the optical carrier. The optical output is transmitted through the optical link or network 120 to the receiver 130. The optical link or network 120 may be a point-to-point fiber link, a part of one or more optical networks in various configurations including, e.g., fiber ring optical networks.

The transmitter 110 includes two or more duobinary modulators 111A and 11B for modulating input binary data channels to produce duobinary encoded signals. Each duobinary encodes signal is then sent into a respective analog signal mixer (e.g., 113A or 113B) to mix with a local oscillator signal to produce a modulation control signal. Each modulation control signal is then applied to an I-OSSB-SC modulator 114 to produce the optical output. FIG. 1 only shows an example of two data channels, a 10 Gb/s channel No. 1 and a 10 Gb/s channel No. 2. In other implementations, the design in FIG. 1 may be applied to more than two data channels. An example for four channels is described later in this application.

Each duobinary modulator 111A or 111B modulates the phase of each optical binary pulse in a data channel to produce the corresponding duobinary signal. One implementation of the duobinary modulation is described by Yonenaga and Kuwano in "Dispersion-tolerant optical transmission system using duobinary transmitter and binary receiver," Journal of Lightwave Technology, Vol. 15, No. 8, pages 1530-1537 (August 1997). Yonenaga and Kuwano show the reduced bandwidth of the duobinary signal in comparison with the original binary signal and illustrate the improved tolerance to chromatic dispersion. In the current system, each duobinary signal has three digital levels and is mixed with an analog local oscillator signal at an RF or microwave frequency to produce a modulation control signal that represents the corresponding input binary data channel. In the example in FIG. 1, two local oscillators 112A (LO#1) and 112B (LO#2) are shown to supply the two analog local oscillator signals to the mixers 113A and 113B, respectively.

FIG. 2 illustrates the operation of each analog mixer 113A or 113B. FIG. 2A shows an example of the transfer function of an analog microwave mixer (the mixer 113A or 113B). Note that the transfer function has two phase regions with a phase shift of 180 degrees ($\pi$). The three-level duobinary signal received by the mixer is shown in FIG. 2B. The operation of the transfer function in FIG. 2A on the duobinary signal in FIG. 2B produces the mixer output signal shown in FIG. 2C where signal with two intensity levels: "mark" and "space" states. Due to the phase change in the transfer function of the analog mixer, the "mark" states can have one of two phase values, 0 and $\pi$, corresponding to the logic states "1" and "−1" of the duobinary encoded signal. This mixer output signal can be used to modulate a CW optical carrier beam.

Figure 2D:
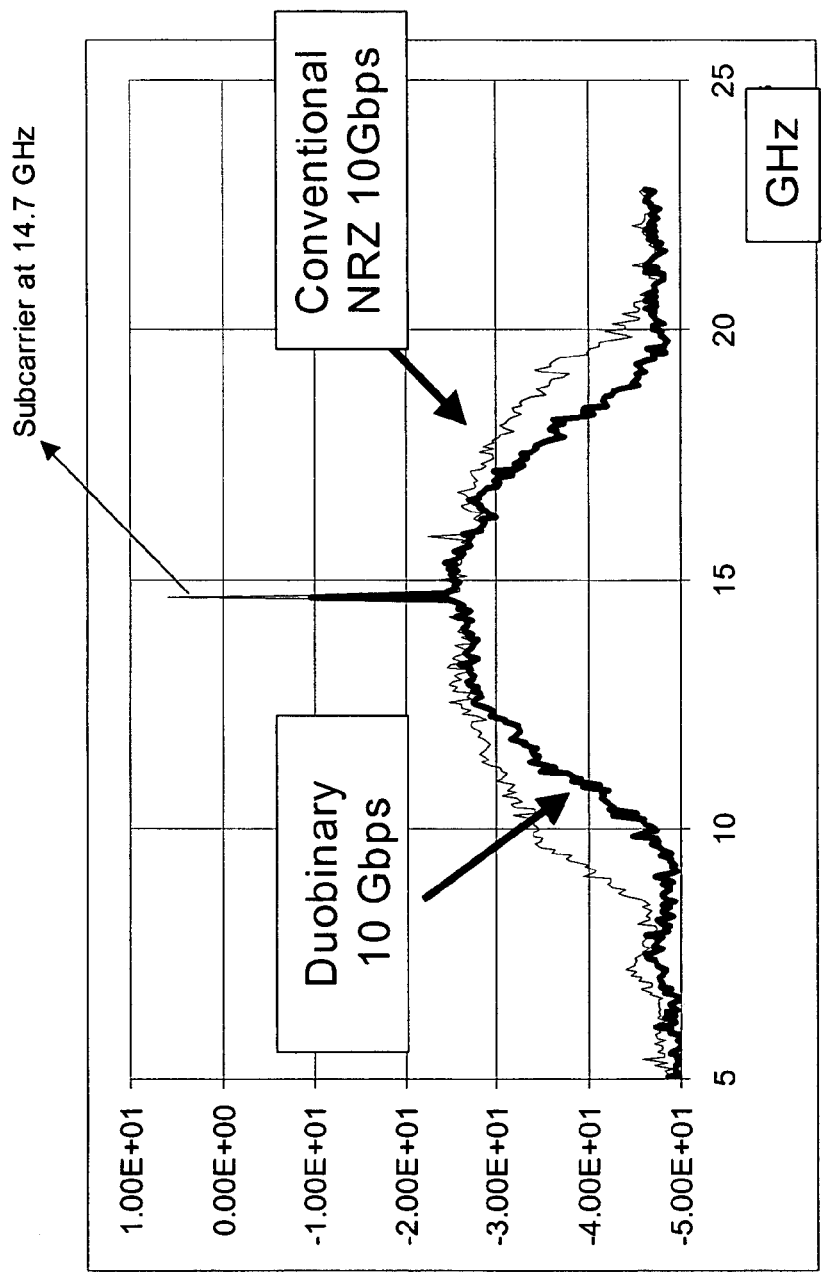
FIG. 2 includes FIGS. 2A, 2B, 2C, and 2D and shows operation of the system in FIG. 1.

The subcarrier multiplexed (SCM) duobinary modulation technique shown in FIG. 1 uses the 3-level duobinary signal to directly drive a microwave mixer whose output voltage-versus-bias voltage transfer function is similar to the sinusoidal power-bias voltage transfer function of an optical Mach-Zehnder modulator. The amplitude and phase of marks and spaces at the output of the microwave mixer are shown in FIG. 2C where each pulse waveform is superimposed on a BPSK microwave subcarrier. A typical microwave spectrum at the output of a duobinary subcarrier is shown in FIG. 2D, in which the microwave subcarrier frequency is at 14.7 GHz. This microwave subcarrier is then applied to amplitude-modulate an optical Mach-Zehnder modulator. Therefore, to a certain extent, the present modulation method effectuates a microwave-PSK/AM modulation. The demodulation is carried out by using an optical filter to extract the microwave-PSK/AM signal and sent directly to a baseband optical receiver as illustrated by the receiver 133 in FIG. 1.

Figure 3A:
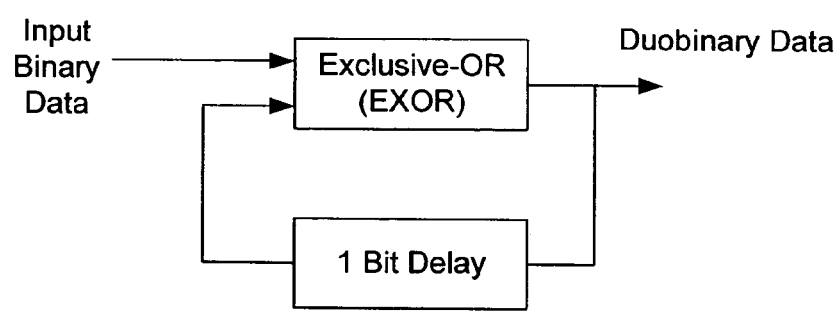
FIGS. 3A and 3B show two examples of electronic duobinary modulators or encoders.
Figure 3B:
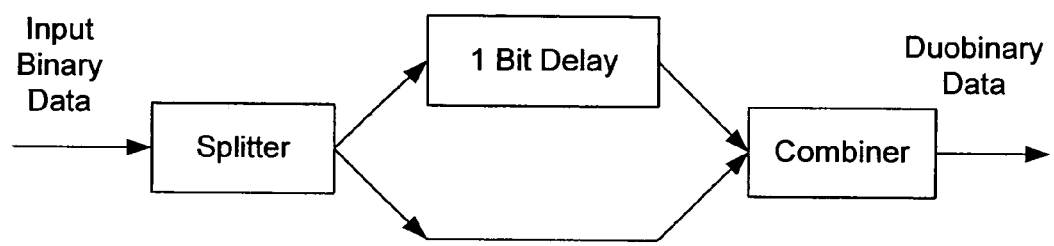

Various duobinary encoders or modulators may be used to implement the duobinary modulators 111A and 111B in FIG. 1. One exemplary method is to pass an NRZ signal through a delay-and-add circuit, and the other exemplary method is to pass an NRZ signal through a low-pass-filter whose 3-dB bandwidth is 25% of the NRZ data rate. FIGS. 3A and 3B show two duobinary encoders based on a 1-bit delay mechanism. In FIG. 3A, the duobinary encoder uses an exclusive OR circuit and a feedback loop with a bit delay to convert an input binary signal into a duobinary output. In FIG. 3B, the duobinary encoder includes a signal splitter to split an input binary data signal into a first binary data signal and a second binary data signal, a first signal path to receive the first binary data signal, a second signal path comprising a 1-bit delay device to receive the second binary data signal, and a signal combiner to combine the first and the second binary signals from the first and second signal paths into a corresponding duobinary encoded signal.

Figure 4A:
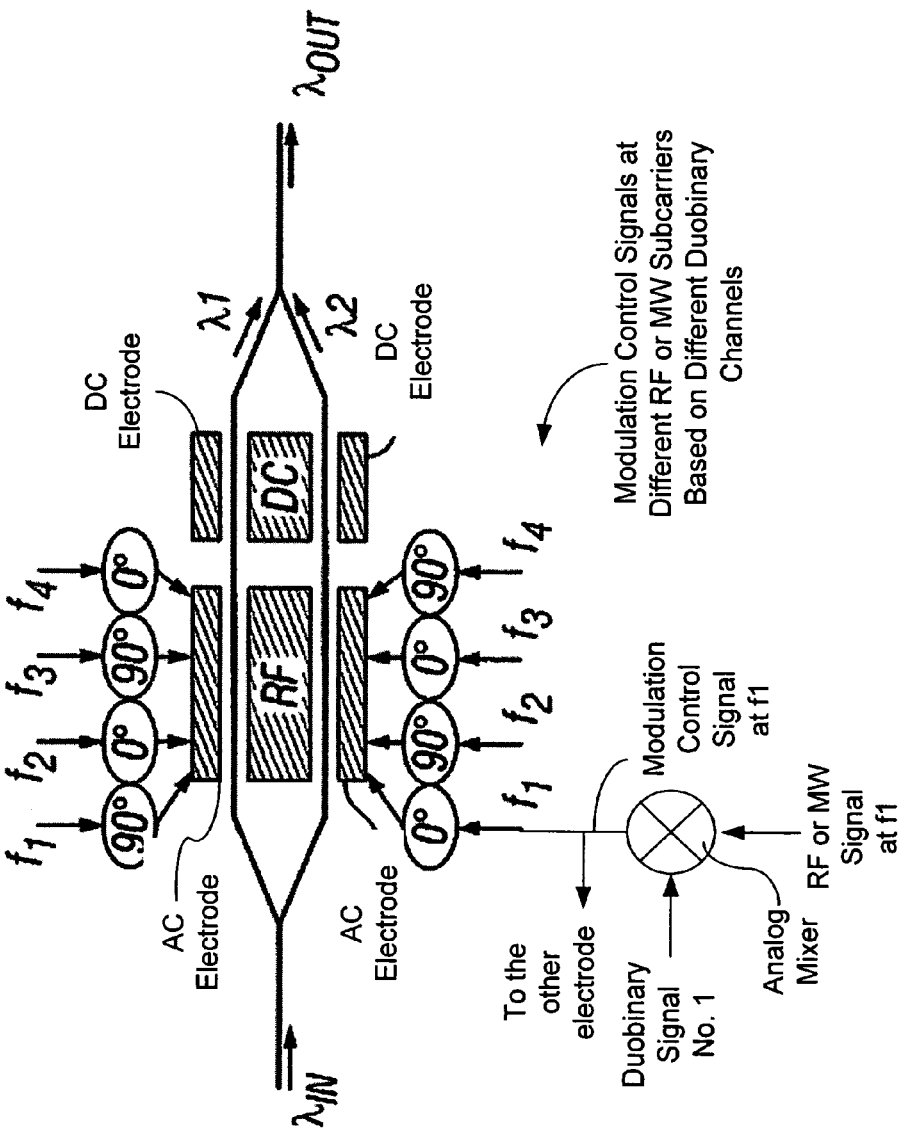
FIG. 4A shows one example of an optical single sideband modulator based on a Mach-Zehnder modulator for modulating four different data channels.

The modulator 114 in FIG. 1 may be implemented by an I-OSSB-SC modulator in U.S. Pat. No. 6,525,857. FIG. 4A illustrates an implementation of the I-OSSB for 4 different channels f1, f2, f3 and f4. For convenience, the labels "f1," "f2," "f3" and "f4" are used to represent the channels and their frequencies in the RF/microwave range and in the optical range. FIG. 4B illustrates the spectral components of various optical signals in FIG. 4A. A Mach-Zehnder modulator using an electro-optic material such as $LiNbO_3$ other others may be used. Two separate optical paths are provided and an input splitter is used to split the input into two signals for the two optical paths and an optical combiner is used to combine the two modulated optical signals from the two paths into a single output signal. The labels "λ1" and "λ2" are used here to represent the two optical signals in the two optical paths. The optical modulator includes AC electrodes for receiving RF or microwave modulation control signals and DC electrodes to receive DC bias. Four RF or microwave (MW) signal connectors are provided for each arm of the optical modulator. RF or microwave phase modulators or shifters are used in the signal paths to provide the desired phase shifts as shown in FIG. 4A. A corresponding analog signal mixer is used to supply the corresponding modulation control signal. Only the mixer for the channel f1 is shown and the mixers for other channels are omitted. At the output of the mixer, a signal splitter is used to split the modulation control signal into two parts, one for the AC electrode of the upper optical arm and another for the aC electrode of the lower optical arm.

In FIG. 4A, an input CW laser beam kin includes only the optical carrier as shown in FIG. 4B. The optical phase modulation at the upper optical arm produces the signal λ1 containing the channels to be transmitted. After further application of a DC field by the DC electrode, the output signal λ1 can be represented by the spectrum in FIG. 4B. Four separate signals f1, f2, f3, and f4 are multiplexed onto the optical carrier, each producing both an upper side band and a lower side band. Adjacent channels in each optical arm are 90 degrees out of phase with each other. Hence, assuming f1, f2, f3 and f4 are in ascending order in frequency, the channels f1 and f2 are phase shifted by 90 degrees with each other; channels f2 and f3 are phase shifted by 90 degrees with each other; and channels f3 and f4 are phase shifted by 90 degrees with each other. The optical phase modulation also produces two identical sidebands symmetrically on opposite sides of the optical carrier. As such, 8 side bands are generated for the four channels and each channel is duplicated in the optical signal.

The channels in the lower optical arm are similarly phase shifted as shown in FIG. 6B. Each of the signals, f1, f2, f3 and f4 is applied to the lower arm in quadrature with the corresponding signal f1, f2, f3 and f4 in the upper arm. In addition, one optical arm is then placed in quadrature with the other optical arm by the DC bias on the DC electrode. As a result, upper sidebands for channels f1 and f3 in the upper optical arm are phase shifted by 180 degrees with respect to upper side bands for channels f1 and f3 in the lower optical arm, respectively. Upper sidebands for channels f2 and f4 in the upper optical arm are in phase with respect to upper side bands for channels f2 and f4 in the lower optical arm, respectively. The lower sidebands for channels f1 and f3 in the upper optical arm are in phase with respect to lower side bands for channels f1 and f3 in the lower optical arm, respectively. The upper sidebands for channels f2 and f4 in the upper optical arm are phase shifted by 180 degrees with respect to lower side bands for channels f2 and f4 in the lower optical arm, respectively.

When the two signals λ1 and λ2 are combined to form the output signal λout, upper side bands for channels f1 and f3 are cancelled in, leaving only f2 and f4. Likewise, in the lower side band, f2 and f2 signals are cancelled, leaving only f1 and f3. Thus, the output signal λout contains the optical carrier and the two side bands, the lower side band carrying f1 and f3 and the upper side band carrying f2 and f4. The system can be easily modified to reverse the order such that the lower side band will carry f2 and f4 and the upper will carry f1 and f3. As can be appreciated from the spectrum for λout in FIG. 4B, each channel has no directly adjacent channels, that is, every other channel has been cancelled. This is a reason for the term "interleaved" for the modulation technique.

Figure 5:
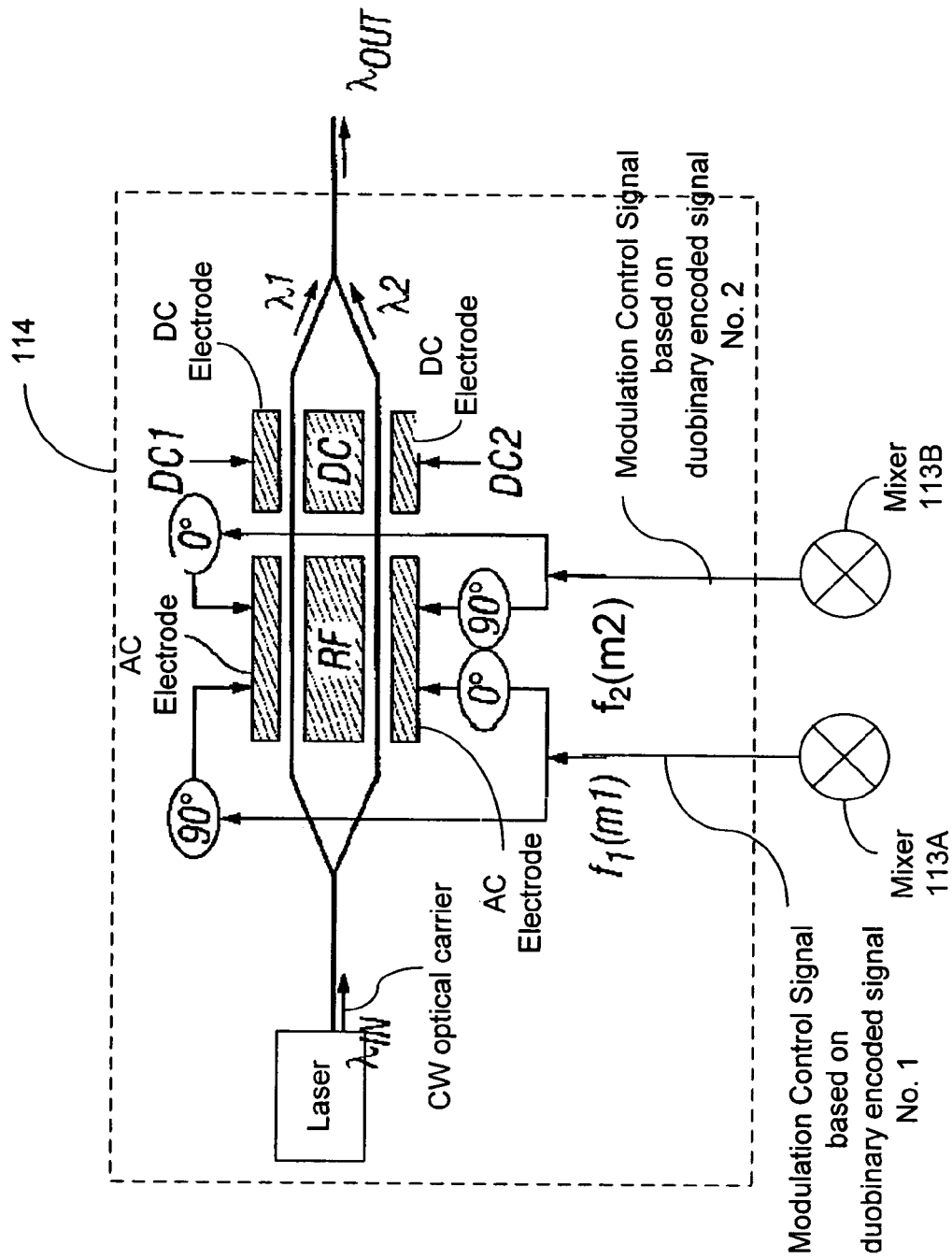
FIG. 5 shows one example of an optical single sideband modulator based on a Mach-Zehnder modulator for modulating two different data channels.

FIG. 5 shows an example of the modulator 114 for multiplexing two channels f1 and f2 in the duobinary form. In this particular example, a Mach-Zehnder modulator is used to perform the optical modulation of a CW optical carrier from a laser. The two modulation controls signals f1(m1) and f2(m2) produced from the two different duobinary encoded signals No. 1 and No. 2 are applied to two control electrodes of the two optical paths of the modulator with desired phase shifts. The RF or microwave frequencies of the two signals f1(m1) and f2(m2) may be different so that the side band modulations on both sides of the optical carrier from the two modulation controls signals f1(m1) and f2(m2) do not overlap and are spaced apart, e.g., the signal f1(m1) may be at about 12 GHz and the signal f2(m2) may be at about 15 GHz so that the two optical subcarriers for the signals f1(m1) and f2(m2) are at asymmetric positions on the two opposite sides of the optical carrier. This asymmetric channel arrangement can also be used for more than two channels such as the 4-channel example shown in FIGS. 4A and 4B. The optical output signal in FIG. 5 includes the optical carrier at the center and two sidebands on two opposite sides of the optical carrier with one sideband for the channel f1 and the other sideband for the channel f2.

In the above OSSB, the optical carrier can be suppressed by optical filtering to reject the optical carrier.

Figure 6:
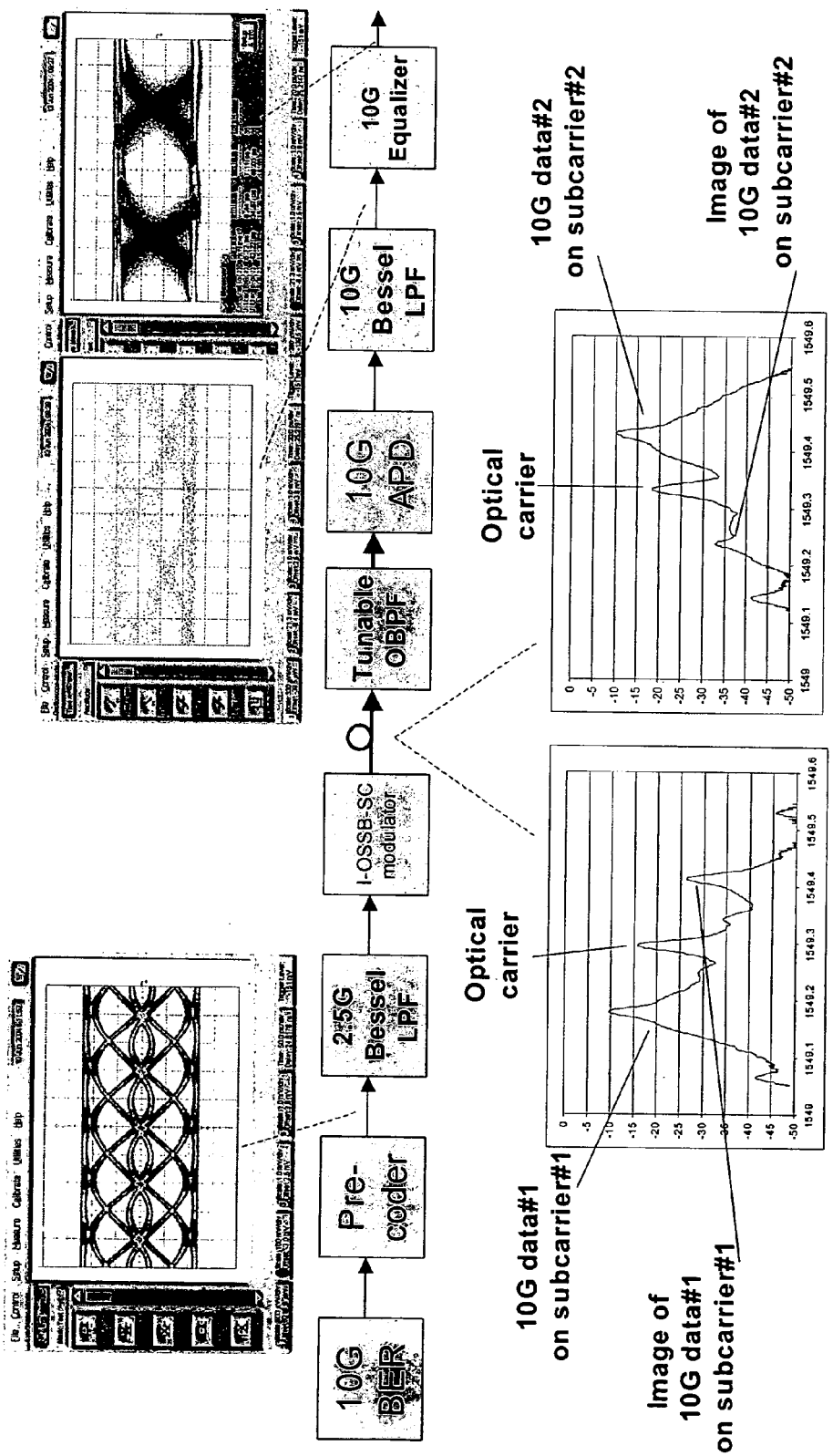
FIG. 6 shows an implementation of the system in FIG. 1 and related optical spectra and eye diagrams of various signals.

FIG. 6 shows an exemplary system based on the design in FIG. 1 using the OSSB modulator. The demodulation is carried out by using an optical filter to extract the microwave-PSK/AM signal and sent directly to a baseband optical receiver. The lower left spectrum chart shows the optical spectrum of the optical output from the OSSB modulator for the baseband data channel No. 1 at 10 Gps and the lower right spectrum chart shows the optical spectrum of the optical output from the OSSB modulator for a different baseband data channel No. 2 at 10 Gps. The two subcarrier frequencies are different. The eye diagrams for the signals at three different stages in the system are also shown in FIG. 6.

Referring back to FIG. 1, the receiver 130 as shown includes an optical filter 131 to select a desired optical subcarrier from the optical transmission of the optical link or network 120 to detect, an optical detector 133 to convert the optical signal of the selected optical subcarrier into an electronic signal, and a signal equalizer 135 to condition the converted electronic signal before data recovery or further signal processing.

The optical filter 131 may be a fixed bandpass filter to select a particular predetermined optical carrier frequency for detection or processing. The optical filter 131 may also be a tunable optical bandpass filter to tunably select a desired optical carrier frequency and to select different signals to detect at different times if desired. The optical subcarriers that are rejected by the optical filter 131 may be directed to other optical receivers designed to detect signals at different optical subcarriers in some implementations or discarded in other implementations. A fiber Bragg grating filter, tunable or fixed, may be used as the optical filter 131 and may be combined with an optical circulator to direct the filtered and rejected light signals. Alternatively, an optical WDM demultiplexer may be used to replace the optical filter 131 and to separate different optical signals at different subcarrier frequencies to different optical paths for detection or processing.

The signal equalizer 135 may be optional and can be used to equalize the signal amplitudes of different frequency components in an input signal. Various electronic components in the transmitter 110, such as the signal mixers 113A and 113B, may have limited bandwidths in their device transfer functions and thus may undesirably attenuate certain frequency components of the signals, e.g., some high frequency components. The signal equalizer 135 may be designed to exhibit different signal gains at different frequency components (e.g., higher gains at high frequency components) to equalize the signal amplitudes of different frequency components.

As described above, other optical SCM modulation techniques may be used to replace the OSSB modulation. One example is optical double side band (ODSB) modulation. FIGS. 7-12 illustrate various ODSB modulators.

The optical double-sideband modulation technique can be used to achieve even higher spectral efficiency than optical single-sideband modulation techniques.

Figure 7:
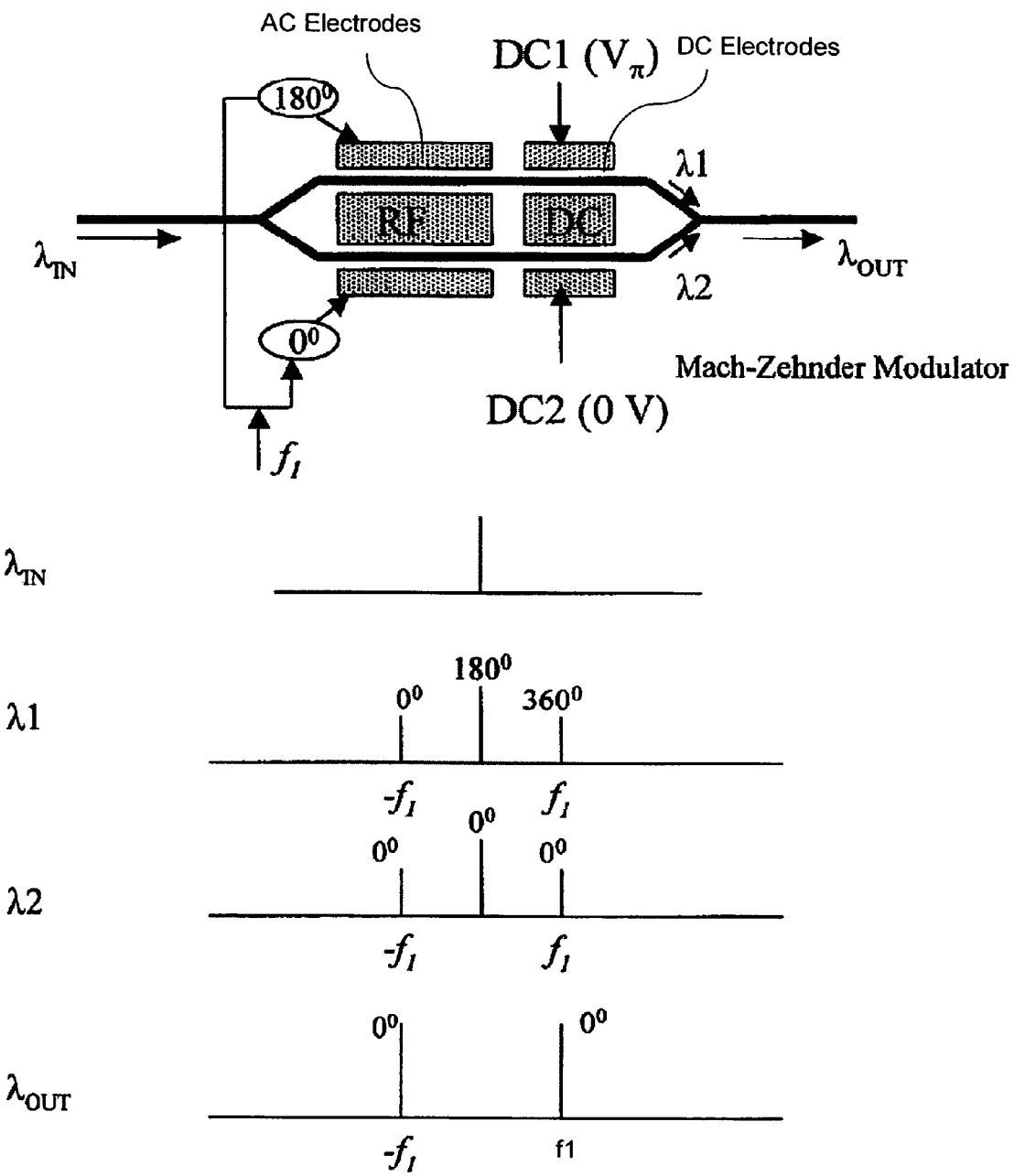
FIG. 7 shows the basic design and operation of an optical double sideband modulator using a Mach-Zehnder modulator.

An ODSB modulator, like the example for the OSSB shown above, may use a Lithium-Niobate Mach Zehnder interferometer modulator to carry out the modulation. FIG. 7 illustrates one example of an ODSB modulator. The bias voltages on the DC electrodes of the two optical arms differ in phase by 180 degrees, and the phases of the modulating signals on the AC electrodes of the two arms also differ by 180 degrees. Under these phase conditions, the optical carrier is suppressed in the optical output. This elimination of the optical carrier can reduce or avoid any optical fiber nonlinearity-induced system penalty, and to reduce adjacent channel interference from the optical carrier to the modulated signals.

Notably, the design in FIG. 7 produces two sidebands representing the same modulating signal, and consequently one half of the available bandwidth in the optical output signal is wasted. This shortcoming can be overcome by ODSB designs in FIGS. 8-12 to achieve a high spectral efficiency. In some implementations, one or two wavelength-locked CW DFB lasers are used as the optical sources for one or two externally modulated LiNbO3 MZIs, respectively. The center wavelength of each laser is offset from a standard ITU wavelength for WDM, dense WDM, and ultra dense WDM applications. Each MZI is modulated by a few subcarrier multiplexed RF/microwave signals using ODSB modulation. If one uses only one MZI, the modulated output from the MZI is passed through a narrowband optical filter. If one uses two MZIs, the two sets of ODSB modulated signals are then combined and passed through a narrowband optical filter. The modulating signal center frequencies can be adjusted, depending on (1) the bandwidth of the MZI, (2) the offset of the laser center frequency from a standard ITU grid, (3) the bandwidth of the narrowband optical filter, and (4) the minimization of system performance penalty due to four-wave mixing and other optical nonlinear effects.

Figure 8:
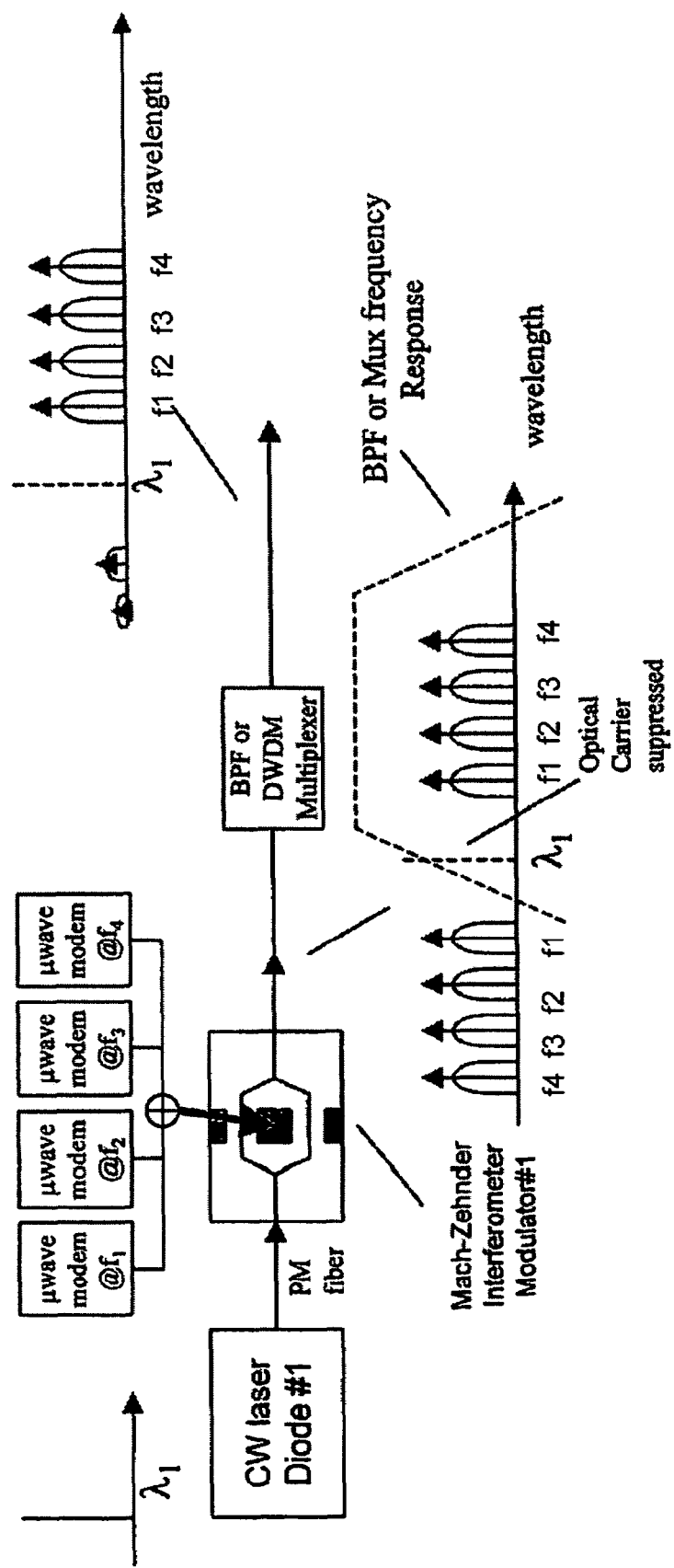
FIGS. 8, 9, 10, 11 and 12 show exemplary implementations of optical double sideband modulators.

In FIG. 8, for an ITU window centered at $\lambda 0$, a wavelength-locked laser centered at $\lambda 1$ (equals to $\lambda 0-\Delta\lambda$ or $\lambda 0+\Delta\lambda$), where $\Delta\lambda$ is the offset wavelength. The output of the laser is connected to the input of an MZI modulator via a polarization-maintaining fiber. The MZI modulator is modulated by multi channel RF/microwave signals. These RF/microwave signals can be of any modulation type that can be demodulated by a narrowband channel optical filter and envelop detection, for example, amplitude-shifted-keying (ASK) signals. The modulation on the MZI is based on ODSB technique illustrated in FIG. 7. Consequently, the outputs of each MZI are double sideband signals with suppressed carrier. The double-sideband signals are then sent to a narrowband optical bandpass filter (BPF) or DWDM multiplexer. The center frequency of the BPF or the DWDM multiplexer is at $\lambda 0$, and its pass-band is just enough to pass one sideband of each modulating signal. The BPF or DWDM multiplexer can be designed such that (1) its pass-band is just enough to pass a group of single sideband signals under all environmental variations (e.g., temperature change), and (2) its edge roll-off can be sharp enough to cut off the unwanted single sidebands on another side of the optical carrier. The wanted single-sidebands should also stay away from the edge of the BPF or DWDM multiplexer to avoid being affected by the nonlinear phase/group delay occurring at the filter band-edges. A single laser is used to produce the sidebands and thus there is no need for locking the relative frequencies of the sidebands.

Figure 9:
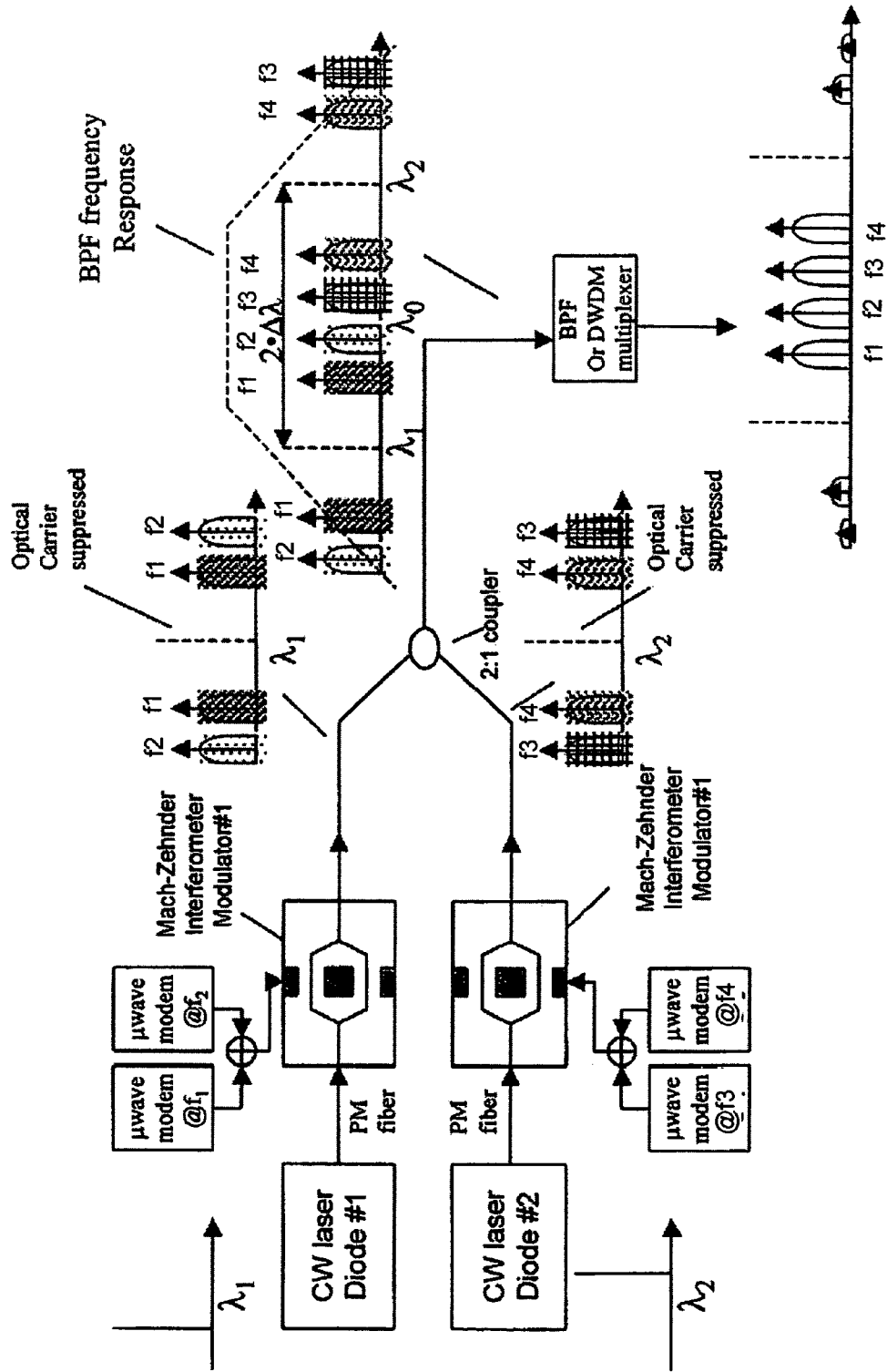

FIG. 9 shows another ODSB design with two wavelength-locked lasers with their laser frequencies centered at $\lambda 1$ ($=\lambda 0-\Delta\lambda$) and $\lambda 2(=\lambda 0+\Delta\lambda)$, respectively, for an ITU window centered at $\lambda 0$. Two MZI modulators are used, one for modulating one half of the data channels and the other for modulating the remaining half of the data channels. As such, the modulation bandwidth of each MZI modulator can be one half of that used in FIG. 8. The output of each laser is connected to the input of an MZI modulator via a polarization-maintaining fiber. The outputs of each MZI are also double-sideband signals with suppressed carrier. The first ODSB output from the upper MZI is centered at $\lambda 1$, and the other ODSB output from the lower MZI is centered at $\lambda 2$. The two ODSB signals $\lambda 1$ and $\lambda 2$ are then combined at an optical combiner (e.g., a 2:1 optical coupler) and sent to an optical bandpass filter (BPF) or a DWDM multiplexer. The center frequency of the BPF or the DWDM multiplexer is at the ITU wavelength $\lambda 0$, and its pass-band is just wide enough to pass the sidebands of the two ODSB signals $\lambda 1$ and $\lambda 2$ between the two optical carriers $\lambda 1$ and $\lambda 2$ and narrow enough to reject the two optical carriers and other sidebands. As illustrated, four different modulating signals which can be passed through the BPF or DWDM multiplexer. The final result is an output signal consisting of four different single-sidebands of information. Note that f1 and f2 of the subcarrier multiplexed signals should be high enough such that the unwanted single sidebands can be eliminated more completely.

Figure 10:
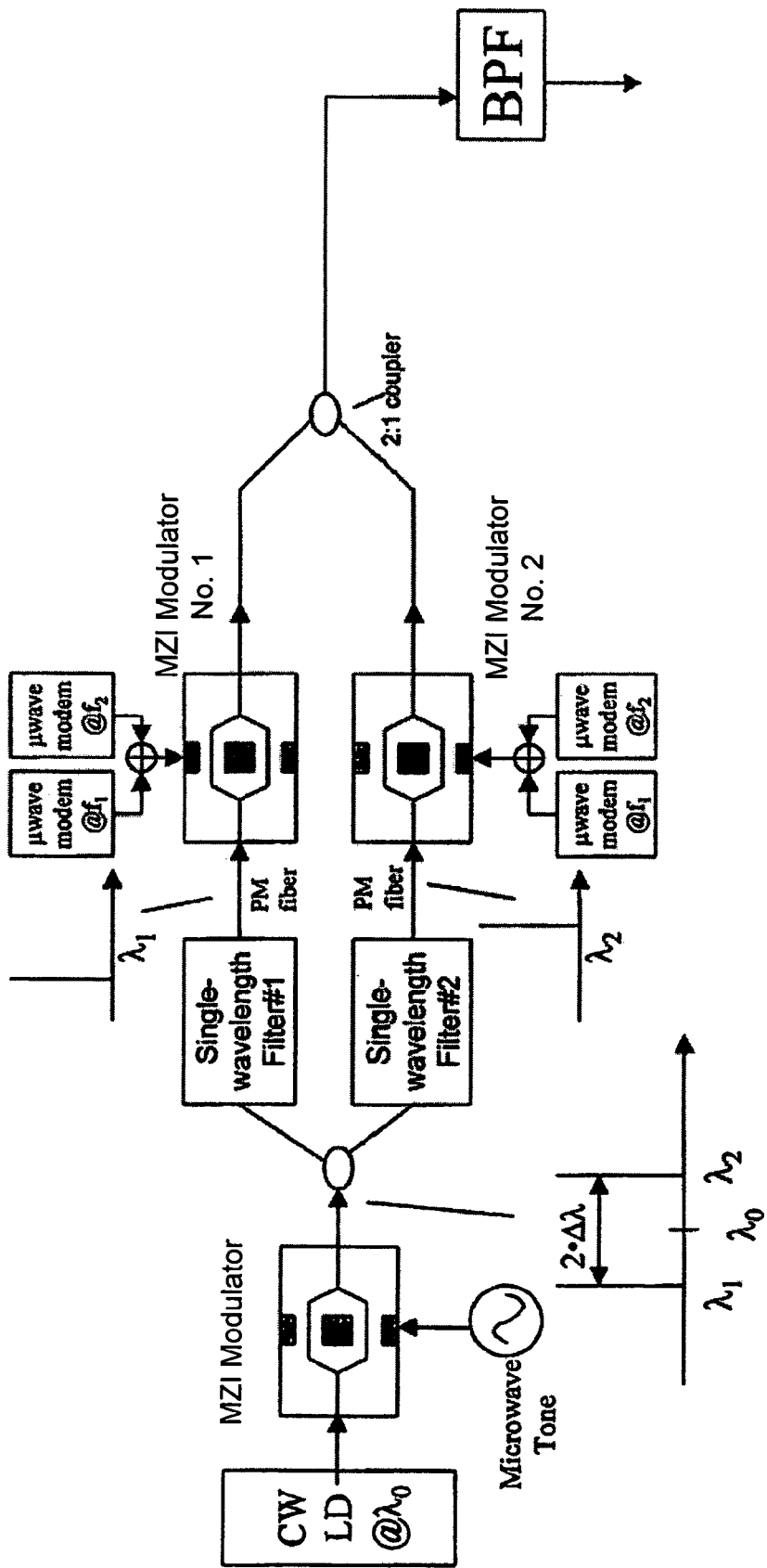

FIG. 10 shows an ODSB modulator using a single optical source such as a CW diode laser to generate two offset optical carriers. A ODSB transmitter, which is a MZI modulator, is being used to generate two offset optical carriers. The ODSB transmitter is modulated by a microwave tone at a carrier frequency given by $(½)(c/\lambda 1-c/2)=c\Delta\lambda(\lambda 1 \lambda 2)$ where c is the speed of the light. Two narrowband optical filters are used to filter out the optical carriers at $\lambda 1$ and $\lambda 2$, respectively. The rest of the operation is the same as the ODSB modulator in FIG. 9.

Figure 11:
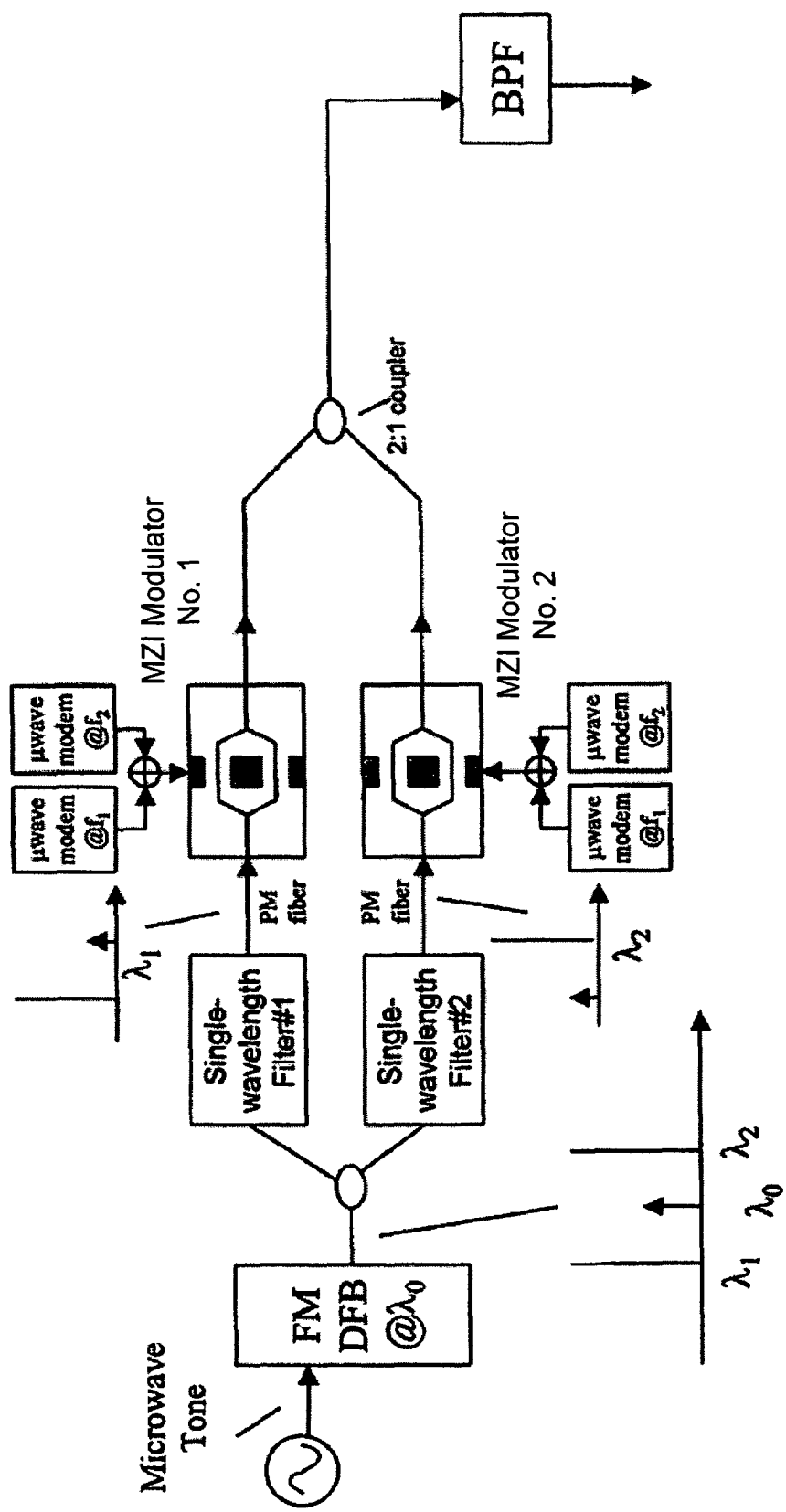
Figure 12:
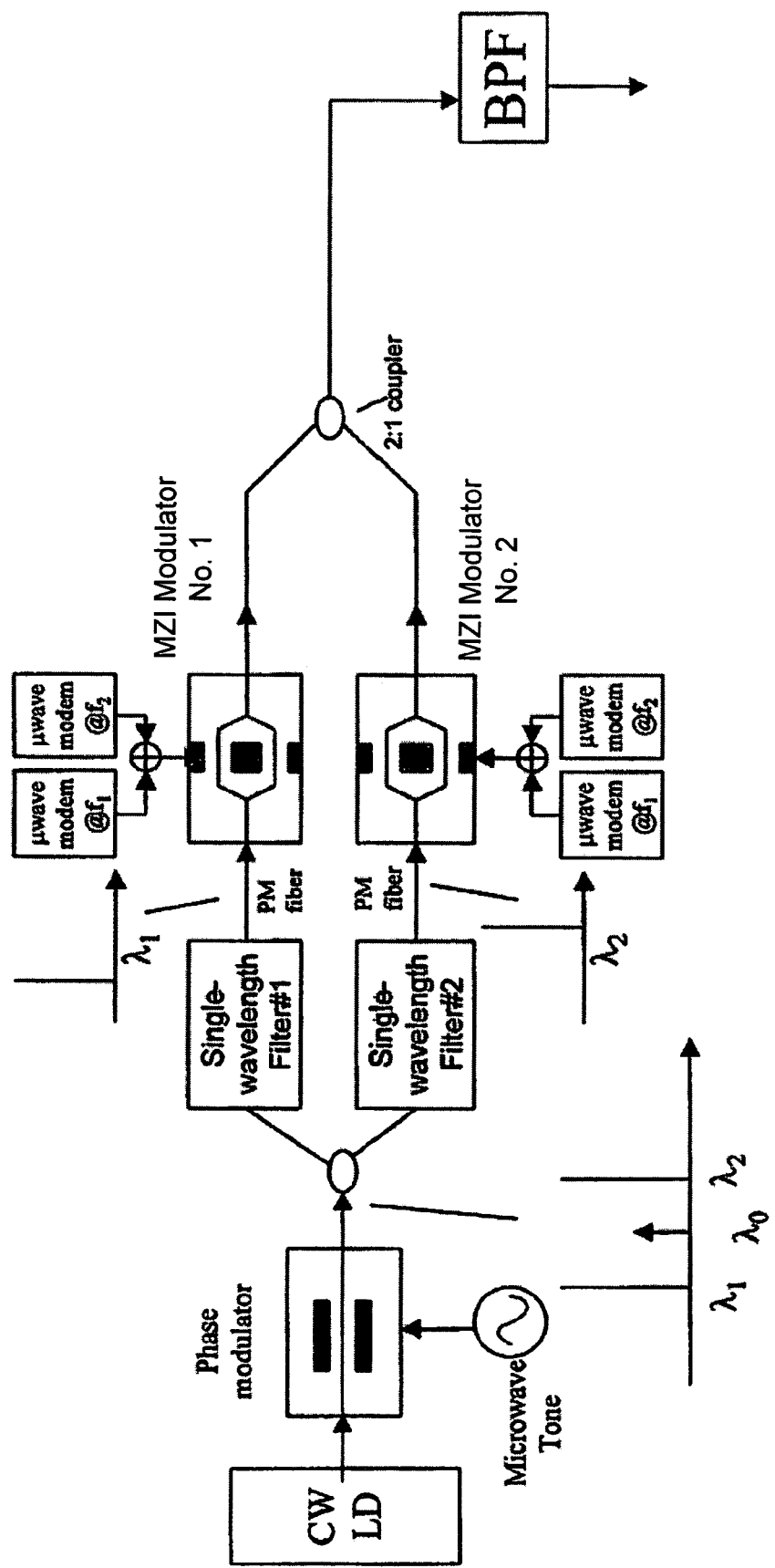

FIG. 11 shows another ODSB modulator using a direct frequency-modulated (FM) laser diode (LD) as the two off-set-optical-carrier generating source. According to the basic FM modulation theory, when the FM modulation index $\beta$ equals 2.4, the center carrier disappears, and the two sidebands at $\lambda 1$ and $\lambda 2$ reach a maximum value. Thus, the FM modulation can be controlled to produce the two sidebands at $\lambda 1$ and $\lambda 2$ as the two optical carriers. FIG. 12 shows yet another ODSB modulator using a single CW laser diode and an optical phase modulator to modulate the CW laser beam in response to a microwave tone.

Figure 13:
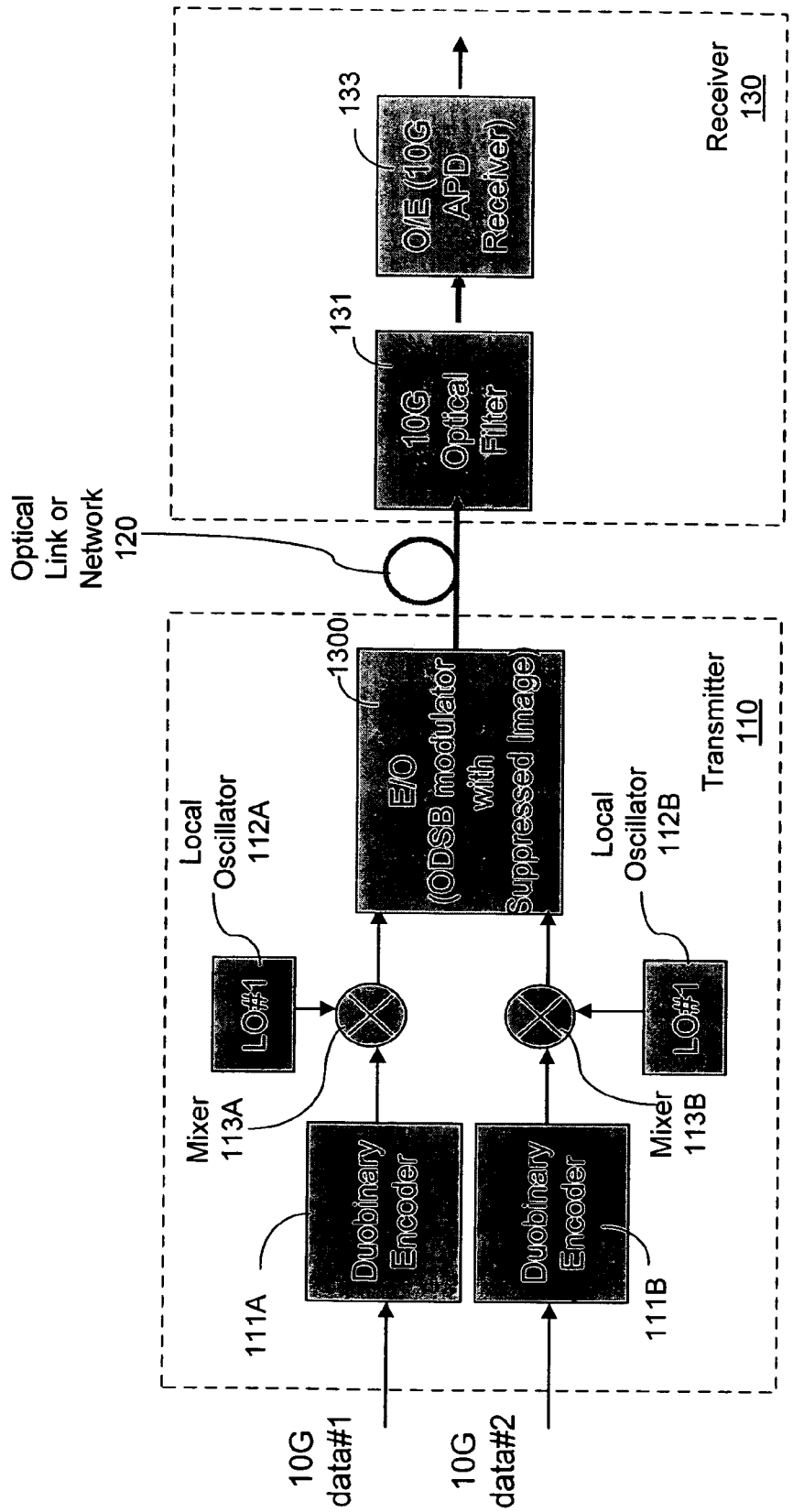
FIG. 13 shows an example of an optical communication system that combines duobinary modulation and optical subcarrier multiplexing using an optical double sideband (ODSB) modulator.

FIG. 13 further illustrates an optical communication system using an ODSB modulator 1300 with suppressed images to replace the OSSB modulator 114 in FIG. 1.

Figure 14:
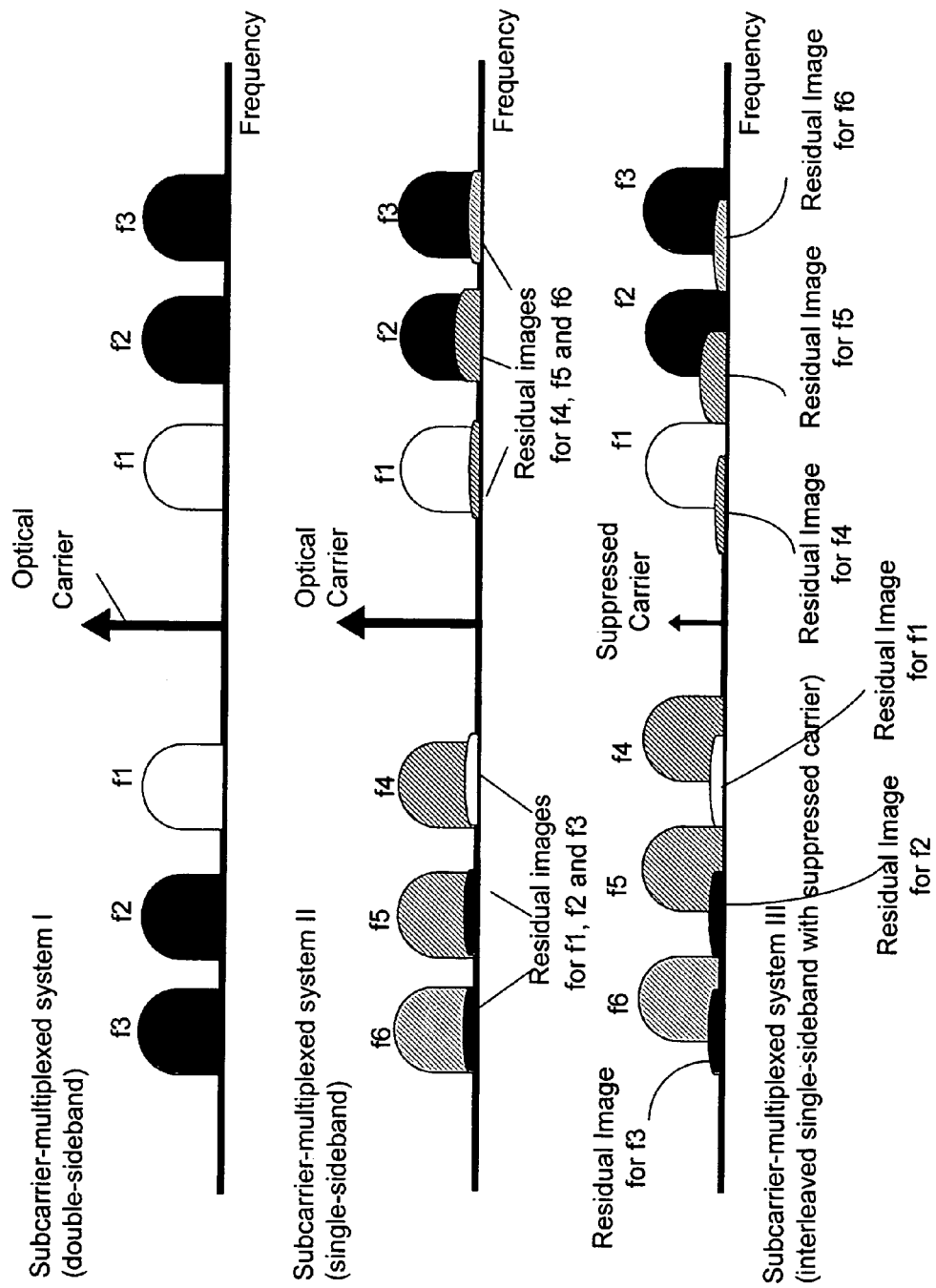
FIG. 14 shows three examples of multi-channel duobinary optical signals using optical subcarrier multiplexed systems based on either OSSB or ODSB modulation to show the signal spectra.

FIG. 14 shows three examples of multi-channel duobinary optical signals using optical subcarrier multiplexed systems based on either OSSB or ODSB modulation to show the signal spectra.

Only a few implementations and examples are disclosed. However, it is understood that variations and enhancements may be made.

What is claimed is what is described and illustrated, including:

1. A device, comprising:
    a plurality of analog signal mixers to respectively produce a plurality of analog modulation control signals that respectively carry a plurality of data channels, each analog signal mixer configured to receive and mix a data channel encoded as a duobinary encoded signal and a local oscillator signal at a local oscillator frequency different from local oscillator frequencies received by other analog signal mixers to produce a corresponding analog modulation control signal; and
    an optical modulator to receive an input CW laser beam at an optical carrier frequency and to modulate the input CW laser beam in response to the analog modulation control signals to produce an optical output beam which comprises a plurality of different optical subcarriers at optical subcarrier frequencies different from the optical carrier frequency and respectively related to the local oscillator frequencies of the local oscillator signals, wherein each optical subcarrier carries a baseband signal comprising information of a corresponding data channel of the data channels so that the different optical subcarriers carry baseband signals corresponding to the plurality of data channels, respectively, and
    wherein the optical modulator is an optical Mach-Zehnder modulator which comprises:
    an optical splitter which splits the input CW laser beam into a first optical carrier beam and a second optical carrier beam, both at the optical carrier frequency;
    a first AC phase modulator to apply the analog modulation control signals with a 90-degree phase shift between two analog modulation control signals adjacent in frequency to modulate the first optical carrier beam to produce a first modulated optical signal;
    a second AC phase modulator to apply the analog modulation control signals with a 90-degree phase shift between two analog modulation control signals adjacent in frequency to modulate the second optical carrier beam to produce a second modulated optical signal, each analog modulation control signal in the first AC phase modulator being phase shifted by 90 degrees relative to each corresponding analog modulation control signal in the second AC phase modulator;
    first and second DC phase modulators to modulate the first and the second optical signals, respectively, and configured to modulate an optical carrier component at the optical carrier frequency of the first modulated optical signal to be phase shifted by 90 degrees relative to an optical carrier component at the optical carrier frequency of the second modulated optical signal; and
    an optical combiner which combines the first and second modulated optical signals to form the output optical beam carrying the plurality of data channels, wherein each data channel is carried by only one of the different optical subcarriers and the optical subcarrier frequencies are different from the optical carrier frequency by amounts corresponding to the local oscillator frequencies of the local oscillator signals.

2. The device as in claim 1, further comprising:
    a plurality of duobinary modulators respectively receive a plurality of binary data signals that respectively correspond to the data channels and to convert the binary data signals into the duobinary encoded signals sent to the analog signal mixers.

3. The device as in claim 2, wherein one of the duobinary modulators comprises a signal splitter to split a binary data signal into a first binary data signal and a second binary data signal, a first signal path to receive the first binary data signal, a second signal path comprising a bit delay device to receive the second binary data signal, and a signal combiner to combine the first and the second binary signals from the first and second signal paths into a corresponding duobinary encoded signal.

4. The device as in claim 2, wherein each binary signal is a NRZ binary signal and one of the duobinary modulators comprises a low-pass filter whose 3-dB bandwidth is 25% of a data rate of the NRZ binary signal.

5. A device, comprising:
    a plurality of analog signal mixers to respectively produce a plurality of analog modulation control signals that respectively carry a plurality of data channels, each analog signal mixer configured to receive and mix a data channel encoded as a duobinary encoded signal and a local oscillator signal at a local oscillator frequency different from local oscillator frequencies received by other analog signal mixers to produce a corresponding analog modulation control signal; and
    an optical modulator to receive an input CW laser beam at an optical carrier frequency and to modulate the input CW laser beam in response to the analog modulation control signals to produce an optical output beam which comprises a plurality of different optical subcarriers at optical subcarrier frequencies different from the optical carrier frequency and respectively related to the local oscillator frequencies of the local oscillator signals, wherein each optical subcarrier carries a baseband signal comprising information of a corresponding data channel of the data channels so that the different optical subcarriers carry baseband signals corresponding to the plurality of data channels, respectively, wherein the optical modulator is an optical double sideband modulator and comprises:
an optical carrier modulator to modulate the input CW laser beam to produce an optical beam having first and second carrier frequencies on two opposite sides of the optical carrier frequency;
an optical splitter which splits the optical beam into a first optical beam and a second optical beam;
a first optical filter to filter the first optical beam to transmit light at the first optical carrier frequency as a first optical carrier beam while rejecting light at the second carrier frequency and the optical carrier frequency;
a second optical filter to filter the second optical beam to transmit light at the second optical carrier frequency as a second optical carrier beam while rejecting light at the first carrier frequency and the optical carrier frequency;
a first optical Mach-Zehnder modulator to apply the analog modulation control signals and a DC bias to two optical modulation paths to cause a 180-degree phase shift between the optical modulation paths and to produce a first output optical signal which carries the plurality of different optical subcarriers at optical subcarrier frequencies at both sides o of the first optical carrier frequency and different from the first optical carrier frequency by amounts corresponding to the local oscillator frequencies of the local oscillator signals and in which light at the first optical carrier frequency is suppressed;
a second optical Mach-Zehnder modulator to apply the analog modulation control signals and a DC bias to two optical modulation paths to cause a 180-degree phase shift between the optical modulation paths and to produce a second output optical signal which carries the plurality of different optical subcarriers at optical subcarrier frequencies at both sides of the second optical carrier frequency and different from the second optical carrier frequency by amounts corresponding to the local oscillator frequencies of the local oscillator signals and in which light at the second optical carrier frequency is suppressed;
an optical combiner to combine the first and second output optical signals into a single combined beam; and
an optical filtering device to filter the single combined beam to transmit optical subcarriers at frequencies between the first optical subcarrier and the second optical carrier frequency while rejecting other optical subcarriers to produce the optical output beam.

6. The device as in claim 5, wherein the optical carrier modulator is an optical modulator which applies a microwave CW tone at a frequency of (½)(c/λ1−c/λ2) to modulate the input CW laser beam, wherein λ1 and λ2 are the first and second optical carrier frequencies in wavelength, respectively.

7. The device as in claim 6, wherein the optical modulator is an optical amplitude modulator.

8. The device as in claim 6, wherein the optical modulator is an optical phase modulator.

9. The device as in claim 5, further comprising:
a plurality of duobinary modulators respectively receive a plurality of binary data signals that respectively correspond to the data channels and to convert the binary data signals into the duobinary encoded signals sent to the analog signal mixers.

10. The device as in claim 9, wherein one of the duobinary modulators comprises a signal splitter to split a binary data signal into a first binary data signal and a second binary data signal, a first signal path to receive the first binary data signal, a second signal path comprising a bit delay device to receive the second binary data signal, and a signal combiner to combine the first and the second binary signals from the first and second signal paths into a corresponding duobinary encoded signal.

11. The device as in claim 9, wherein each binary signal is a NRZ binary signal and one of the duobinary modulators comprises a low-pass filter whose 3-dB bandwidth is 25% of a data rate of the NRZ binary signal.

12. A method, comprising:
receiving a plurality of data channels encoded as duobinary encoded signals;
using a plurality of analog signal mixers to respectively mix the plurality of data channels and a plurality of local oscillator signals at respectively different local oscillator frequencies to produce a plurality of analog modulation control signals that respectively carry the plurality of data channels; and
receiving an input CW laser beam at an optical carrier frequency;
using an optical splitter to split the input CW laser beam into a first optical carrier beam and a second optical carrier beam, both at the optical carrier frequency;
applying the plurality of analog modulation control signals with a 90-degree phase shift between two analog modulation control signals adjacent in frequency to modulate the first and second optical carrier beam to produce respectively a first and second modulated optical signal, each analog modulation control signal applied to the first optical carrier beam being phase shifted by 90 degrees relative to each corresponding analog modulation control signal applied to the second optical carrier beam;
modulating an optical carrier component at the optical carrier frequency of the first modulated optical signal to be phase shifted by 90 degrees relative to an optical carrier component at the optical carrier frequency of the second modulated optical signal; and
using an optical combiner to combine the first and second modulated optical signals to form an output optical beam carrying the plurality of data channels, wherein:
the optical output beam comprises a plurality of different optical subcarriers at optical subcarrier frequencies different from the optical carrier frequency and respectively related to the local oscillator frequencies of the local oscillator signals,
each optical subcarrier carries a baseband signal comprising information of a corresponding data channel of the data channels so that the different optical subcarriers carry baseband signals corresponding to the plurality of data channels, respectively, and
each data channel is carried by only one of the different optical subcarriers and the optical subcarrier frequencies are different from the optical carrier frequency by amounts corresponding to the local oscillator frequencies of the local oscillator signals.

13. A method, comprising:
receiving a plurality of data channels encoded as duobinary encoded signals;
using a plurality of analog signal mixers to respectively mix the plurality of data channels and a plurality of local oscillator signals at respectively different local oscillator frequencies to produce a plurality of analog modulation control signals that respectively carry the plurality of data channels;
receiving an input CW laser beam at an optical carrier frequency;

modulating the input CW laser beam to produce an optical beam having first and second carrier frequencies on two opposite sides of the optical carrier frequency;

using an optical splitter to split the optical beam into a first optical beam and a second optical beam;

filtering the first optical beam to transmit light at the first optical carrier frequency as a first optical carrier beam while rejecting light at the second carrier frequency and the optical carrier frequency;

filtering the second optical beam to transmit light at the second optical carrier frequency as a second optical carrier beam while rejecting light at the first carrier frequency and the optical carrier frequency;

applying the analog modulation control signals and a DC bias to two optical modulation paths to cause a 180-degree phase shift between the optical modulation paths and to produce a first output optical signal which carries the plurality of different optical subcarriers at optical subcarrier frequencies at both sides of the first optical carrier frequency and different from the first optical carrier frequency by amounts corresponding to the local oscillator frequencies of the local oscillator signals and in which light at the first optical carrier frequency is suppressed;

applying the analog modulation control signals and a DC bias to two other optical modulation paths to cause a 180-degree phase shift between the optical modulation paths and to produce a second output optical signal which carries the plurality of different optical subcarriers at optical subcarrier frequencies at both sides of the second optical carrier frequency and different from the second optical carrier frequency by amounts corresponding to the local oscillator frequencies of the local oscillator signals and in which light at the second optical carrier frequency is suppressed;

using an optical combiner to combine the first and second output optical signals into a single combined beam; and filtering the single combined beam to transmit optical subcarriers at frequencies between the first optical subcarrier and the second optical carrier frequency while rejecting other optical subcarriers to produce an optical output beam comprising a plurality of different optical subcarriers at optical subcarrier frequencies different from the optical carrier frequency and respectively related to the local oscillator frequencies of the local oscillator signals, wherein each optical subcarrier carries a baseband signal comprising information of a corresponding data channel of the data channels so that the different optical subcarriers carry baseband signals corresponding to the plurality of data channels, respectively.

* * * * *